(12) United States Patent
Shibuya et al.

(10) Patent No.: US 9,705,363 B2
(45) Date of Patent: Jul. 11, 2017

(54) COMMUNICATION CONTROL DEVICE AND MOUNTING BOARD

(71) Applicant: Renesas Electronics Corporation, Tokyo (JP)

(72) Inventors: Hiroki Shibuya, Tokyo (JP); Hideki Sasaki, Tokyo (JP); Tatsuaki Tsukuda, Tokyo (JP); Tadashi Shimizu, Tokyo (JP); Masahiro Dobashi, Tokyo (JP); Shinji Nishizono, Tokyo (JP); Hiroko Kubota, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 14/896,867

(22) PCT Filed: Jun. 14, 2013

(86) PCT No.: PCT/JP2013/066420
§ 371 (c)(1),
(2) Date: Dec. 8, 2015

(87) PCT Pub. No.: WO2014/199507
PCT Pub. Date: Dec. 18, 2014

(65) Prior Publication Data
US 2016/0156231 A1 Jun. 2, 2016

(51) Int. Cl.
*H04B 1/46* (2006.01)
*H02J 50/12* (2016.01)
*H04B 5/00* (2006.01)

(52) U.S. Cl.
CPC ............ *H02J 50/12* (2016.02); *H04B 5/0037* (2013.01); *H04B 5/0081* (2013.01)

(58) Field of Classification Search
None
See application file for complete search history.

(56) References Cited

U.S. PATENT DOCUMENTS 7,863,718 B2 * 1/2011 Usami ................. H01L 27/0688
257/531
8,050,070 B2 * 11/2011 Shionoiri ............ H01L 27/0629
363/125

(Continued)

FOREIGN PATENT DOCUMENTS

CN 101197009 A 6/2008
CN 100507941 C 7/2009

(Continued)

OTHER PUBLICATIONS

International Search Report (ISR) (PCT Form PCT/ISA/210), in PCT/JP2013/066420, dated Sep. 10, 2013.
Japanese Office Action dated Sep. 29, 2016 for JP 2015-522364 with an English translation.

(Continued)

*Primary Examiner* — Tuan A Tran
(74) *Attorney, Agent, or Firm* — McGinn IP Law Group, PLLC.

(57) ABSTRACT

In a communication control device in which an antenna electrode having an antenna connected thereto, a power supply circuit, and a communication circuit are mounted on a mounting board, the antenna electrode is disposed at one corner portion on a principal surface of the mounting board, the communication circuit is disposed on a side of a first side of the principal surface that shares the corner portion, and the power supply circuit is disposed on a side of a second side facing the first side. Further, a first signal path connecting the antenna electrode and the communication circuit extends along the first side, and a second signal path connecting the antenna electrode and the power supply circuit extends along a third side that shares the corner portion and is perpendicular to the first side.

16 Claims, 33 Drawing Sheets

(56) References Cited

U.S. PATENT DOCUMENTS

| | | | | |
|---|---|---|---|---|
| 8,052,059 B2 * | 11/2011 | Saito | G06K 19/0701 235/487 |
| 8,199,551 B2 * | 6/2012 | Matsuzaki | G11C 11/4023 365/149 |
| 8,232,880 B2 * | 7/2012 | Yamazaki | G06K 19/0701 340/10.1 |
| 8,384,081 B2 * | 2/2013 | Yamazaki | G11C 17/12 257/57 |
| 8,436,359 B2 * | 5/2013 | Akimoto | H01L 27/105 257/258 |
| 9,147,148 B2 * | 9/2015 | Ziller | G07C 9/00944 |
| 9,184,509 B2 * | 11/2015 | Baba | H01Q 1/245 |
| 2005/0134435 A1 | 6/2005 | Koyama et al. | |
| 2007/0229281 A1 | 10/2007 | Shionoiri et al. | |
| 2008/0136604 A1 * | 6/2008 | Kozuma | H01M 10/425 340/10.51 |
| 2010/0320962 A1 | 12/2010 | Sekita et al. | |

FOREIGN PATENT DOCUMENTS

| | | |
|---|---|---|
| JP | H 06-085408 A | 3/1994 |
| JP | H 09-232790 A | 9/1997 |
| JP | 2005-204493 A | 7/2005 |
| JP | 2008-112862 A | 5/2008 |
| JP | 2008-147573 A | 6/2008 |
| JP | 2008-165744 A | 7/2008 |
| JP | 2008-271188 A | 11/2008 |
| JP | 2011-030404 A | 2/2011 |
| JP | 2011-082797 A | 4/2011 |
| JP | 2012-234551 A | 11/2012 |
| WO | WO 2013/054596 A1 | 4/2013 |
| WO | WO 2013/061899 A1 | 5/2013 |

OTHER PUBLICATIONS

Chinese Office Action dated Feb. 4, 2017 for Chinese Office Action in CN201380077426.0 with an English translation.

\* cited by examiner

COMMUNICATION CONTROL DEVICE AND MOUNTING BOARD

TECHNICAL FIELD

The invention relates to a communication control device which performs communication through an antenna, and a mounting board, and relates to, for example, an effective technique applied to a communication control device that switches between communication for transmitting information and the supply and reception of power by sharing one antenna.

BACKGROUND ART

Systems (hereinafter, referred to as "wireless power supply systems"), using a non-contact power transmission method, which supply power to a portable terminal and the like in a non-contact manner without passing through a power cord or the like have been practically used because of a demand for completely cordless portable terminals, such as a smartphone, and household electric appliances. For example, there have been known wireless power supply systems of an electromagnetic induction type using electromagnetic induction between antennas (coils), disposed so as to be separated from each other, and an electromagnetic resonance type using resonant coupling of an electromagnetic field. In addition, near field communication (NFC) is known as a standard specification related to a non-contact communication technique for transmitting information in a wireless manner, and small-sized portable terminal devices based on an NFC specification have also begun to spread.

For example, PTL 1 discloses a semiconductor device that performs the transmission and reception of data by a first antenna circuit and drives an internal circuit using power of electromagnetic waves received by a second antenna circuit, as the related art for performing the transmission and reception of data and the reception of power through electromagnetic waves. In addition, PTL 2 discloses a technique for performing non-contact communication and non-contact charging using one antenna.

CITATION LIST

Patent Literature

[PTL 1] JP-A-2012-234551
[PTL 2] JP-A-2011-30404

DISCLOSURE OF THE INVENTION

Problems that the Invention is to Solve

A wireless power supply system is constituted by a power transmission side device that transmits power and a power reception side device that receives the transmitted power. The power reception side device includes a communication control device (communication module) in which a power supply unit for generating a desired voltage and the like on the basis of power received through an antenna and a communication unit for performing the transmission and reception of data through the antenna are formed. For example, a portable terminal serving as the power reception side device is configured such that an internal circuit can be driven and a battery can be charged on the basis of power received by the power supply unit through the antenna, and is configured to be able to perform data communication with the power transmission side device or the like by the communication unit. In recent years, the development of a wireless power supply system that shares an antenna used for communication based on NFC and an antenna used for electromagnetic resonance type wireless power supply and switches between communication for transmitting information and the supply and reception of power (hereinafter, referred to as an "NFC type wireless power supply system") has proceeded. In the NFC type wireless power supply system, a power supply unit and a communication unit share one antenna.

In recent years, in many communication modules that switch communication for transmitting information and the supply and reception of power using one antenna as in the NFC type wireless power supply system, a power supply unit and a communication unit have been formed on separate mounting boards, which has resulted in an increase in the size of the communication module.

The inventor of this application has examined that a power supply unit and a communication unit are formed on one mounting board in order to achieve a reduction in the size of a communication module. However, it has become apparent that characteristics of the communication module deteriorate only when the power supply unit and the communication unit are simply formed on the same mounting board. For example, noise generated in the power supply unit is propagated to the communication unit through the mounting board, and thus there is a concern of an adverse effect being exerted on the communication characteristics of the communication unit.

A means for solving such problems and the like will be described below, and other problems and new features of the invention will become apparent from the description in this specification and the accompanying drawings.

Means for Solving the Problems

The following is a brief description of the outline of a representative embodiment among embodiments disclosed in this application.

That is, in this communication control device, an antenna electrode to which an antenna is connected, a power supply circuit which is connected to the antenna electrode, and a communication circuit which is connected to the antenna electrode are mounted on a mounting board. The antenna electrode is disposed at one corner portion on a first principal surface of the mounting board. The communication circuit is disposed on the side of a first side of the first principal surface which shares the corner portion. The power supply circuit is disposed on the side of a second side facing the first side. A first signal path connecting the antenna electrode and the communication circuit extends along the first side. A second signal path connecting the antenna electrode and the power supply circuit extends along a third side that shares the corner portion and is perpendicular to the first side.

Effects of the Invention

The following is a brief description of effects achievable by a representative embodiment among embodiments disclosed in this application.

That is, it is possible to achieve a reduction in the size of a communication control device while suppressing the deterioration of the characteristics of the communication control device.

DESCRIPTION OF EMBODIMENTS

1. Summary of the Embodiments

Figure 1:
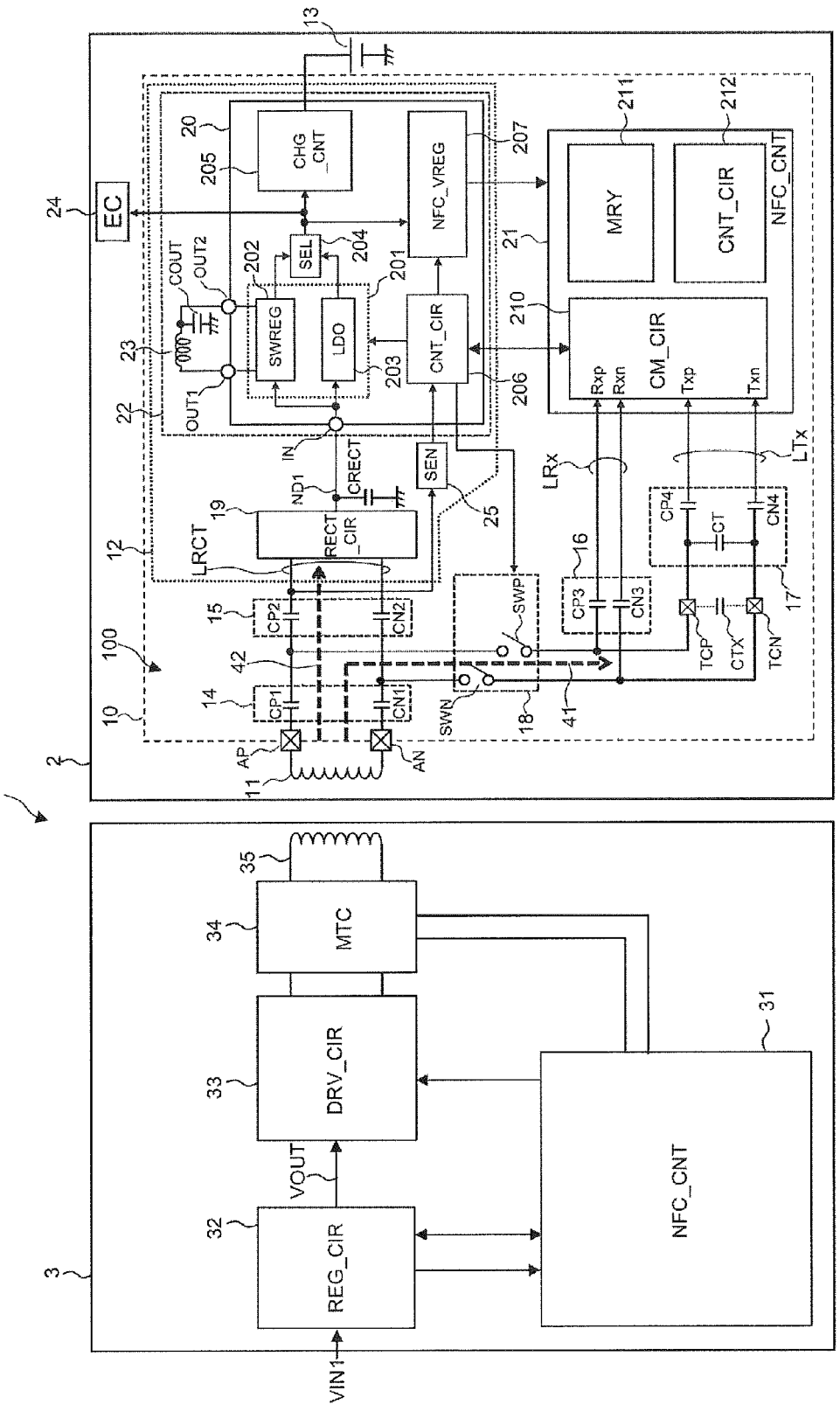
FIG. 1 is a diagram illustrating a wireless power supply system on which a communication control device according to a first embodiment is mounted.

First, summary of representative embodiments of the invention disclosed in the application will be described. Reference numerals in drawings in parentheses referred to in description of the summary of the representative embodiments just denote components included in the concept of the components to which the reference numerals are designated.

[1] (Communication Module Arranged so that Power Supply System Path and Communication System Path which Extend from Common Antenna Electrode on Mounting Board are Perpendicular to Each Other)

A communication control device (10 (10A, 10B, 10C)) according to a representative embodiment includes antenna electrodes (AP, AN) to which an antenna (11) is connected, a power supply circuit (12) which is connected to the antenna electrodes, and a communication circuit (21) which is connected to the antenna electrodes, in which the antenna electrodes, the power supply circuit, and the communication circuit are mounted on a mounting board (100 (101, 102, 103)). The antenna electrodes are disposed at one corner portion (CR1) on a first principal surface (front face) of the mounting board. The communication circuit is disposed on a side of a first side (S1) of the first principal surface which shares the corner portion. The power supply circuit is disposed on a side of a second side (S3) facing the first side. A first signal path (41) connecting the antenna electrodes and the communication circuit extends along the first side. A second signal path (42) connecting the antenna electrodes and the power supply circuit extends along a third side (S2) that shares the corner portion and is perpendicular to the first side.

If the second signal path connecting the antenna electrodes and the power supply circuit and the first signal path connecting the antenna electrodes and the communication circuit are formed to be parallel to each other, a magnetic field generated in the second signal path is interlinked with the first signal path, and a noise current flows to the first signal path. On the other hand, according to this communication control device, even in case that the power supply circuit and the communication circuit are mounted on the same substrate, the magnetic field generated in the second signal path is not interlinked with the first signal path, and thus it is possible to suppress noise from the second signal path to the first signal path, which makes the communication circuit less likely to be influenced by noise from the power supply circuit. In addition, it is possible to reduce the area of the substrate compared to a case where the first signal path and the second signal path are simply formed to be separated from each other in order to suppress the influence of noise. That is, it is possible to achieve a reduction in the size of the communication control device while suppressing the deterioration of the characteristics of the communication control device.

[2] (Arrangement in which Signal Path from Antenna to Rectifier Circuit and Communication System Path are Perpendicular to Each Other)

In the communication control device of item. 1, the power supply circuit includes a rectifier circuit (CRECT) (19) that rectifies an AC signal supplied to the antenna electrode, and a DC/DC converter (22) that generates a DC voltage on the basis of a voltage rectified by the rectifier circuit. The second signal path includes a signal path (LRCT) for transmitting a signal to the rectifier circuit from the antenna electrode. The rectifier circuit is disposed along the third side. The DC/DC converter is disposed so as to be separated from the rectifier circuit in a direction of a fourth side (S4) facing the third side.

Accordingly, it is possible to effectively prevent noise from being propagated to the communication circuit or the first signal path from the rectifier circuit that may become the greatest noise source, a signal wiring connected to the rectifier circuit, and the like. In addition, the DC/DC converter and the rectifier circuit are disposed as described above, and thus it is possible to further reduce the area of the substrate.

[3] (Formation of Slit in GND Pattern Formed in the Same Conductive Layer as that in which Communication System Path and Power Supply System Path are Formed)

In the communication control devices (10A, 10C) of item 2, the mounting board is a multi-layered substrate including a plurality of conductive layers (L1 to L4). The antenna electrode, the power supply circuit, the communication circuit, the first signal path, the second signal path, and a first ground pattern (GP10) for connection to a ground potential are formed in the first conductive layer (L1) constituting the first principal surface in the mounting board. The first ground pattern is formed in the vicinity of the first signal path and the second signal path. The first ground pattern has slits (SL10A, SL10B) formed along at least a portion of the second signal path in a region interposed between the first signal path and the second signal path.

Accordingly, it is possible to reduce noise which is propagated to the first signal path by utilizing the first ground pattern from the second signal path.

[4] (Formation of Slit Along Power Supply System Path in GND Pattern of Conductive Layer Different from First Conductive Layer)

In the communication control device of item 3, second ground patterns (GP20, GP30, GP40) for connection to a ground potential are formed in second conductive layers (L2, L3, L4) different from the first conductive layer so as to overlap the first signal path and the second signal path which are formed in the first conductive layer, when seen in a plan view. The second ground patterns have slits (SL20A, SL30A, SL40A) formed along at least a portion of the second signal path, in a region interposed between the first signal path and the second signal path when seen in a plan view.

Accordingly, it is possible to reduce noise which is propagated to the first signal path through the second ground patterns from the second signal path.

[5] (Formation of Slit Along Communication System Path in GND Pattern of Conductive Layer Different from First Conductive Layer)

In the communication control device of item 4, the second ground patterns have slits (SL20B, SL30B, SL40B) formed along at least a portion of the first signal path in a region interposed between the first signal path and the second signal path when seen in a plan view.

Accordingly, it is possible to further reduce noise which is propagated to the first signal path through the second ground patterns from the second signal path.

[6] (Formation of Slit in Wiring Device Adjacent to First Conductive Layer)

In the communication control device of item 4 or 5, the second conductive layer is a layer (L2) which is adjacent to the first conductive layer.

Accordingly, it is possible to effectively suppress noise which is propagated to the first signal path through the second ground patterns from the second signal path. This is because a tendency for noise generated from the second signal path to be propagated to the first signal path through the ground pattern of the second conductive layer closest to the first conductive layer is considered.

[7] (Slit Width of Equal to or Greater than 3W)

In the communication control device of item 5 or 6, a width of the slit formed in each of the first ground pattern and the second ground pattern is set to be three times or more as large as a minimum line width of a signal wiring formed on the substrate.

Accordingly, it is possible to effectively suppress noise propagation (crosstalk) through the ground pattern.

[8] (Formation of Reception-Side Path of Communication System Path in Single Conductive Layer)

In the communication control device (10 (10A)) of any one of items 1 to 7, the first signal path includes a reception signal path (LRx) for supplying a signal received by the antenna to the communication circuit through the antenna electrode, and a transmission signal path (LTx) for supplying a signal transmitted from the communication circuit to the antenna through the antenna electrode. The reception signal path is formed so as to connect the antenna electrode and the communication circuit without passing through the conductive layers (L2, L3, L4) other than the first conductive layer.

Accordingly, the signal received by the antenna is transmitted to the communication circuit in a single conductive layer, and thus it is possible to reduce parasitic resistance, parasitic capacitance, and parasitic inductance formed in the signal path between the antenna electrode and the communication circuit and to further suppress the deterioration of the communication characteristics of the communication circuit.

[9] (Formation of Power Supply System Path in Single Conductive Layer)

In the communication control device (10B (10C)) of any one of items 1 to 7, the second signal path is formed so as to connect the antenna electrode and the power supply circuit without passing through the conductive layers (L2, L3, L4) other than the first conductive layer.

Accordingly, the signal received by the antenna is transmitted to the power supply circuit in a single conductive layer, and thus it is possible to reduce a parasitic resistance, a parasitic capacitance, and a parasitic inductance formed in the signal path between the antenna electrode and the power supply circuit and to contribute to an improvement in the efficiency of power conversion by the power supply circuit.

[10] (Formation of Electrode for Connection of Trimmer Capacitor on Rear Face)

In the communication control device of any of items 4 to 9, the first signal path includes a matching circuit (17) for matching impedance between the antenna and the communication circuit. The matching circuit is configured to include a capacitive element (CT). The mounting board includes electrodes (TCP, TCN) for connecting the capacitive element and a variable capacitor in parallel. The capacitive element is disposed on the first conductive layer (L1).

The electrode for the connection of the variable capacitor is formed on the third conductive layer (L4) constituting a second principal surface (rear face) facing the first principal surface.

Accordingly, the tuning of a capacity value of the matching circuit is facilitated. In addition, it is not necessary to secure a space for disposing a variable capacitor (for example, a trimmer capacitor) on amounting surface, which contributes to a reduction in the size of the mounting board.

[11] (Matching Circuit of Transmission Signal Path)

In the communication control device of item 10, the matching circuit (17) is disposed on the transmission signal path.

Accordingly, the adjustment of the characteristics of a transmission signal output from the communication circuit is facilitated.

[12] (Switching Between Wireless Power Supply and Data Communication)

In the communication control device of any one of items 1 to 11, the first signal path includes switch circuits (18, SWP, SWN) that switch between connection and disconnection between the antenna electrode and the communication circuit. The switch circuit connects the antenna electrode and the communication circuit to each other in case that the communication circuit performs communication through the antenna, and disconnects the antenna electrode and the communication circuit from each other in case that the power supply circuit generates a DC voltage on the basis of an AC signal received by the antenna.

Accordingly, a signal having large power is applied to a communication device during a power supply operation by the power supply circuit, and thus it is possible to prevent the communication circuit from being broken.

[13] (Formation of Slit Between TX and RX)

In the communication control device of any of items 7 to 12, the second ground patterns (GP20, GP30, GP40) have slits (SL20C, SL30C, SL40C) which are formed in a region interposed between the reception signal path and the transmission signal path when seen in a plan view.

Accordingly, it is possible to prevent noise propagation between the reception signal path and the transmission signal path.

[14] (Formation of Slit Between Controller IC for Switching Regulator and Coil)

In the communication control device of any of items 4 to 13, the DC/DC converter includes a coil (23) and a semiconductor device (20) for realizing a switching regulator by performing switching control of a current flowing to the coil. Third ground patterns (GP21, GP23) for connection to a ground potential are formed in the second conductive layer so as to overlap at least a portion of the semiconductor device disposed on the first conductive layer when seen in a plan view. The second ground patterns and the third ground patterns are disposed so as to form a region (XGP2) having no ground pattern in a range overlapping a region in which the coil is disposed, when seen in a plan view.

Accordingly, heat generated in the coil during the operation of the switching regulator is not likely to be transmitted to the semiconductor device through the third ground pattern, and thus it is possible to suppress an increase in the temperature of the semiconductor device.

[15] (Communication Module Arranged so that Power Supply System Path and Communication System Path Extending from Common Antenna Electrode on Mounting Board Face Each Other)

A communication control device (10D (10E)) according to a representative embodiment different from that of items 1 to 14 includes antenna electrodes (AP, AN) to which an antenna (11) is connected, a power supply circuit (12) which is connected to the antenna electrodes, and a communication circuit (21) which is connected to the antenna electrodes, in which the antenna electrodes, the power supply circuit, and the communication circuit are mounted on a rectangular mounting board (102). The antenna electrodes, the power supply circuit, and the communication circuit are disposed on a principal surface of the mounting board along one long side (S1) of the principal surface. The communication circuit is disposed on a side of one short side (S4) perpendicular to the long side with respect to the antenna electrodes. The power supply circuit is disposed on a side of the other short side (S2) perpendicular to the long side with respect to the antenna electrodes. A first signal path (41) for connecting the antenna electrodes and the communication circuit extends to the side of the one short side (S4) along the long side (S1). A second signal path (42) for connecting the antenna electrodes and the power supply circuit extends to the side of the other short side (S2) along the long side (S1).

Accordingly, the second signal path and the first signal path are formed to be separated from each other even in case that the second signal path for connecting the antenna electrodes and the power supply circuit and the first signal path for connecting the antenna electrodes and the communication circuit are formed on the same substrate so as to be parallel to each other, and thus the first signal path is not likely to be influenced by a magnetic field generated in the second signal path. Thereby, it is possible to suppress noise from the second signal path to the first signal path, which makes the communication circuit less likely to be influenced by noise from the power supply circuit. In addition, it is possible to reduce the area of the substrate compared to a case where the first signal path and the second signal path are simply formed to be separated from each other in order to suppress the influence of noise. In addition, for example, in case that this communication device is applied to a system such as a portable terminal enabling a battery to be charged by a voltage generated by the power supply circuit, the mounting board can be formed in a rectangular shape in accordance with the shape of a lateral side of the battery, and thus the degree of freedom of the arrangement of the mounting board in the portable terminal or the like is increased.

[16] (Formation of Slit in GND Pattern Formed in the Same Conductive Layer as that in which Communication System Path and Power Supply System Path are Formed)

In the communication control device (10E) of item 15, the mounting board is a multi-layered substrate including a plurality of conductive layers (L1 to L4). The antenna electrode, the power supply circuit, the communication circuit, the first signal path, the second signal path, and a first ground pattern (GP12) for connection to a ground potential are formed in the first conductive layer (L1) for forming the first principal surface in the mounting board. The first ground pattern is formed in the vicinity of the first signal path and the second signal path. The first ground pattern has slits (SL12A, SL12B) which are formed so as to divide the pattern into two regions with the antenna electrodes as boundaries.

Accordingly, it is possible to reduce noise which is propagated to the first signal path through the first ground pattern from the second signal path.

[17] (Formation of Slit in GND Pattern Formed in Conductive Layer Different from Those in which Communication System Path and Power Supply System Path are Formed)

In the communication control device of item 16, second ground patterns (GP23, GP32, GP42) for connection to a ground potential are formed in second conductive layers (L2 to L4) different from the first conductive layer so as to overlap the first signal path and the second signal path which are formed in the first conductive layer when seen in a plan view. The second ground patterns have slits (SL23A, SL32A, SL42A), respectively, which are formed so as to divide the pattern into a region on a side on one short side and a region of a side on the other short side with the antenna electrodes as boundaries when seen in a plan view.

Accordingly, it is possible to reduce noise which is propagated to the first signal path through the second ground patterns from the second signal path.

[18] (Formation of Slit in Wiring Device Adjacent to First Conductive Layer)

In the communication control device of item 17, the second conductive layer is a layer (L2) which is adjacent to the first conductive layer.

Accordingly, it is possible to effectively suppress noise which is propagated to the first signal path through the second ground patterns from the second signal path.

[19] (Slit Width of Equal to or Greater than 3W)

In the communication control device of item 17 or 18, a width of the slit formed in the first ground pattern and the second ground pattern is set to be three times as large as, or more than, a minimum line width of a signal wiring formed on the substrate.

Accordingly, it is possible to effectively suppress noise propagation (crosstalk) through the ground pattern.

[20] (Mounting Board Arranged so that Power Supply System Path and Communication System Path Extending from Common Antenna Electrode are Perpendicular to Each Other)

Mounting boards (100 to 103) according to representative embodiments are substrates for mounting a power supply circuit (12) for generating a desired voltage on the basis of power received through an antenna (11) and a communication circuit (21) for transmitting and receiving data through the antenna. This mounting board includes antenna electrodes (AP, AN) for the connection of the antenna, a first signal path (41) for connecting the antenna electrode and the communication circuit, and a second signal path (42) for connecting the antenna electrode and the power supply circuit. The antenna electrodes are disposed at one corner portion (CR1) on a first principal surface (front face) of the mounting board. The first signal path extends along a first side (S1) that shares the corner portion. The second signal path extends along a second side (S2) that shares the corner portion and is perpendicular to the first side.

Accordingly, the communication circuit mounted on the same substrate as that on which the power supply circuit is mounted is not likely to be influenced by noise generated in the power supply circuit. In addition, it is possible to reduce the area of the substrate compared to a case where the first signal path and the second signal path are simply formed to be separated from each other in order to suppress the influence of noise.

[21] (Arrangement in which Signal Path from Antenna to Rectifier Circuit and Communication System Path are Perpendicular to Each Other)

The mounting board of item 20 includes a region for forming the communication circuit and a region for forming the power supply circuit. The region for forming the power supply circuit includes a region for forming a rectifier circuit (19) that rectifies an AC signal supplied to the antenna electrode and a DC/DC converter (22) that generates a DC voltage on the basis of a voltage rectified by the rectifier circuit. The second signal path includes a signal path (LRCT) for transmitting a signal from the antenna electrode to the rectifier circuit. The region for forming the communication circuit is disposed on a side of the first side. The region for forming the rectifier circuit is formed along the second side. The region for forming the DC/DC converter is formed to be separated from the region for forming the rectifier circuit in a direction of a third side (S4) facing the second side.

Accordingly, it is possible to prevent noise from being propagated to the communication circuit from an input line of the rectifier circuit that may become the greatest noise source. In addition, the DC/DC converter is disposed so as to be separated from the rectifier circuit, disposed on the side of the second side, in a direction of the third side on the opposite side, and thus it is possible to further reduce the area of the substrate.

[22] (Formation of Slit in GND Pattern Formed in the Same Conductive Layer as that in which Communication System Path and Power Supply System Path are Formed)

In the mounting board of item 21, the mounting board is a multi-layered substrate including a plurality of conductive layers (L1 to L4). The antenna electrodes, the region for forming the power supply circuit, the region for forming the communication circuit, the first signal path, the second signal path, and a first ground pattern (GP10) for connection to a ground potential are formed in the first conductive layer (L1) for forming the first principal surface in the mounting board. The first ground pattern is formed in the vicinity of the first signal path and the second signal path. The first ground pattern has slits (SL10A, SL10B) formed along at least a portion of the second signal path in a region interposed between the first signal path and the second signal path.

Accordingly, it is possible to reduce noise which is propagated to the first signal path through the first ground pattern from the second signal path.

[23] (Formation of Slit Along Power Supply System Path in GND Pattern of Conductive Layer Different from First Conductive Layer)

In the mounting board of item 22, second ground patterns (GP20, GP30, GP40) for connection to a ground potential are formed in second conductive layers (L2 to L4) different from the first conductive layer so as to overlap the first signal path and the second signal path which are formed in the first conductive layer, when seen in a plan view. The second ground patterns have slits (SL20A, SL30A, SL40A) formed along at least a portion of the second signal path in a region interposed between the first signal path and the second signal path when seen in a plan view.

Accordingly, it is possible to reduce noise which is propagated to the first signal path through the second ground patterns from the second signal path.

[24] (Formation of Slit Along Communication System Path in GND Pattern of Conductive Layer Different from First Conductive Layer)

In the mounting board of item 23, the second ground patterns have slits (SL20B, SL30B, SL40B) formed along at least a portion of the first signal path in a region interposed between the first signal path and the second signal path when seen in a plan view.

Accordingly, it is possible to further reduce noise which is propagated to the first signal path through the second ground patterns from the second signal path.

[25] (Formation of Slit in Wiring Device Adjacent to First Conductive Layer)

In the mounting board of item 24, the second conductive layer is a layer (L2) adjacent to the first conductive layer.

Accordingly, it is possible to effectively suppress noise which is propagated to the first signal path through the second ground patterns from the second signal path. This is because a tendency for noise generated from the second signal path to be propagated to the first signal path through the ground pattern of the second conductive layer closest to the first conductive layer is considered.

[26] (Communication Device in which Electrode for Connection of Trimmer Capacitor is Formed on Rear Face)

A communication control device (10 (10A to 10C)) according to a representative embodiment different from those of items 1 to 19 includes antenna electrodes (AP, AN) to which an antenna (11) is connected, a power supply circuit (12) which is connected to the antenna electrodes, and a communication circuit (21) which is connected to the antenna electrodes, in which the antenna electrodes, the power supply circuit, and the communication circuit are mounted on a mounting board (100). The mounting board has a first principal surface (front face; L1) for mounting a circuit component and a second principal surface (rear face; L4) which faces the first principal surface. The power supply circuit, the communication circuit, the antenna electrodes, and a matching circuit (17) which is connected between the communication circuit and the antenna electrodes and includes a capacitive element (CT) are formed on the first principal surface. Electrodes (TCP, TCN) for connecting the capacitive element and a variable capacitor (CTX) in parallel are formed on the second principal surface.

Accordingly, the tuning of a capacity value of the matching circuit is facilitated. In addition, it is not necessary to secure a space for disposing a variable capacitor (for example, a trimmer capacitor) on a mounting surface, and thus it is possible to reduce the area of the mounting board, which contributes to a reduction in the size of the communication control device.

[27] (Mounting Board in which Electrode for Connection of Trimmer Capacitor is Formed on Rear Face)

A mounting board (100 (101 to 103)) according to a representative embodiment different from those of items 20 to 25 is a substrate for mounting a power supply circuit (12) for generating a desired voltage on the basis of power received through an antenna (11) and a communication circuit (21) for transmitting and receiving data through the antenna. This mounting board has a first principal surface (front face; L1) for mounting a circuit component, and a second principal surface (rear face; L4) which faces the first principal surface. Antenna electrodes (AP, AN) for the connection of the antenna, a region for forming the power supply circuit, a region for forming the communication circuit, and a region for disposing a capacitive element (CT) as a matching circuit (17) that matches impedance between the antenna and the communication circuit are formed on the first principal surface. Electrodes (TCP, TCN) for connecting the capacitive element and a variable capacitor (CTX) in parallel are formed on the second principal surface.

Accordingly, the tuning of a capacity value of the matching circuit is facilitated. In addition, it is not necessary to secure a space for disposing a variable capacitor (for example, a trimmer capacitor) on a mounting surface, and thus it is possible to reduce the area of the mounting board, which contributes to a reduction in the size of the communication control device.

2. Description Manner in this Application

In this application, a description in the embodiments may be made after being divided into a plurality of sections for the sake of convenience if necessary. These sections are not independent of each other, but each of them may be a part of a single example, or one of them may be a partial detail of the other or a modification example of a part or whole of the other one, unless otherwise specifically indicated. In addition, in all drawings for illustrating modes for carrying out the invention, elements having the same function will be denoted by the same reference numerals and signs, and a description thereof will not be repeated.

Further, in this application, the phrase "semiconductor device" or "semiconductor integrated circuit device" as used herein refers to a device obtained by integrating mainly various transistor (active element) single bodies, and resistors, capacitors, and the like centering on the transistor single bodies on a semiconductor chip or the like (for example, a single-crystal silicon substrate), and a package of a semiconductor chip or the like. Here, typical examples of the various transistors include a Metal Insulator Semiconductor Field Effect Transistor (MISFET) typified by Metal Oxide Semiconductor Field Effect Transistor (MOSFET). At this time, typical examples of an integrated circuit configuration include a Complementary Metal Insulator Semiconductor (CMIS) type integrated circuit typified by a Complementary Metal Oxide Semiconductor (CMOS) integrated circuit having an N-channel type MISFET and a P-channel type MISFET in combination.

Similarly, with regard to any material, any composition, or the like in the description of the embodiments, the phrase "X made of A" or the like does not exclude X having an element other than A, as one of the main constituent components thereof, unless otherwise specifically indicated or unless it is apparent from the context that it is not.

Similarly, preferred examples of the figure, position, attribute, and the like will be shown. However, it is needless to say that the invention is not strictly limited thereto unless otherwise specifically indicated or unless it is apparent from the context that it is not.

Further, in case that a reference is made to a specific number or amount, the number or amount may be greater than or less than the specific number or amount unless otherwise specifically indicated, limited to the specific number or amount theoretically, or unless it is apparent from the context that is it not.

3. Further Detailed Description of the Embodiments

The embodiments will be described in more detail.

<<First Embodiment>>

<Configuration of Wireless Power Supply System>

FIG. 1 illustrates a wireless power supply system on which a communication control device according to a first embodiment is mounted. A wireless power supply system 1 illustrated in the drawing includes a wireless communication device on a power transmission side (hereinafter, referred to as a "power transmission side device") 3 and a wireless communication device on a power reception side (hereinafter, referred to as a "power reception side device") 2. In the wireless power supply system 1, the power transmission side device 3 and the power reception side device 2 can transmit and receive data to and from each other by near field wireless communication. The near field wireless communication is, for example, near field wireless communication by NFC (hereinafter, simply referred to as "NFC communication"). In addition, in the wireless power supply system 1, power can be supplied from the power transmission side device 3 to the power reception side device 2 in a non-contact (wireless) manner. Although not particularly limited, the wireless power supply system 1, which is an electromagnetic resonance type wireless power supply system, can share an antenna used for communication by NFC and an antenna used for electromagnetic resonance type wireless power supply and can switch between communication for transmitting information and the supply and reception of power.

The power transmission side device 3 is configured to include, for example, an NFC control unit (NFC_CNT) 31, a power supply circuit (REG_CIR) 32, a driving circuit (DRV_CIR) 33, a matching circuit (MTC) 34, and an antenna 35. The NFC control unit 31 performs the overall control for performing communication with the power reception side device 2. For example, the NFC control unit controls switching between NFC communication and the supply of power in a wireless manner, and performs various types of processes for performing the transmission and reception of data in the NFC communication. Although not particularly limited, the NFC control unit 31 is constituted by a microcomputer having an NFC communication function. For example, the NFC control unit 31 takes up a signal transmitted from the power reception side device 2 through the antenna 35 into the NFC control unit 31 through the matching circuit 34 at the time of receiving the signal through NFC communication, and transmits a signal from the antenna 35 by giving data to be transmitted to the driving circuit 33 at the time of transmitting the signal through NFC communication.

The matching circuit 34 is a circuit for matching impedance between the antenna 35 and an internal circuit connected to the antenna, and is connected to, for example, the antenna 35 in parallel to form a resonance circuit. Although not particularly limited, the antenna 35 is a coil antenna. The drawing illustrates a case where the antenna 35 is a shared antenna for performing the supply of power and the transmission and reception of a signal through NFC communication, but a configuration in the vicinity of the antenna is not particularly limited. For example, a configuration may be adopted in which a power supply coil receiving an AC signal based on the amount of power to be transmitted, a resonance coil (not connected to a pad or an electrode) which is magnetically coupled to the resonance coil and constitutes a resonance circuit together with a capacitor, and a coil antenna for performing NFC communication are separately provided and the individual coils are disposed so as to overlap each other in a height direction. The driving circuit 33 generates a driving signal for driving the antenna 35. For example, the driving circuit generates a driving signal in accordance with data to be transmitted which is given from the NFC control unit 31 at the time of transmitting a signal in NFC communication, and generates a driving signal according to the magnitude of power to be supplied at the time of transmitting power. The antenna 35 is excited by the driving signal. In addition, the driving circuit 33 operates using an output voltage VOUT output from, for example, the power supply circuit 32 as a power supply.

The power supply circuit 32 generates a plurality of voltages serving as operation power supplies of functional units within the power transmission side device 3 on the basis of an input voltage VIN1 supplied from, for example, a power adapter or a universal serial bus (USB). For example, the power supply circuit generates a voltage VOUT serving as an operation power supply of the driving circuit 32, a voltage serving as an operation power supply of an NFC control unit 1, and the like.

The power reception side device 2, which is a small-sized portable device such as, for example, a portable terminal, is configured such that a battery can be charged by NFC communication and wireless power supply (non-contact power supply). The power reception side device 2 includes, for example, an antenna 11, a communication control device 10, a battery 13, and an internal circuit (EC) 24. The antenna 11, which is, for example, a coil antenna, generates an electromotive force (AC signal) by a resonance effect of electromagnetic waves generated by the antenna 35 of the power transmission side device 3 and transmits and receives a signal according to NFC communication. The internal circuit 24 is an electronic circuit for realizing a specific function as the power reception side device 2 (for example, a smartphone). The battery 13 is a secondary battery that can be charged on the basis of a DC signal. Although not particularly limited, the battery 13 is configured as, for example, a single cell battery (4.0 V to 4.2 V), and is configured as, for example, a lithium-ion battery.

The communication control device 10 switches between a power supply operation of receiving power using one antenna 11 and a communication operation of performing communication for transmitting information. Specifically, the communication control device 10 performs the transmission and reception of data through the antenna 11 during data communication, and generates a desired voltage on the basis of power received through the antenna 11 during the supply of power and performs the driving of each block within the communication control device 10 by the generated voltage, the driving of the internal circuit 24, the charging of the battery 13, and the like.

Specifically, the communication control device 10 is configured as a communication module in which antenna electrodes AP and AN, matching circuits 14 to 17, a power supply circuit 12, a switch unit 18, a communication circuit 21, and the like are mounted on a mounting board 100.

The antenna 11 is connected to the antenna electrodes (antenna terminals or antenna pads) AP and AN. One end of the antenna 11 is connected to the antenna electrode AP, and the other end is connected to the antenna AN. The antenna electrodes AP and AN are electrically connected to the communication circuit 21, and are electrically connected to the power supply circuit 12. Hereinafter, a signal path (path through which a signal is transmitted between the communication circuit 21 and the antenna electrodes AP and AN) which connects the communication circuit 21 and the antenna electrodes AP and AN is referred to as a "communication system path", and a signal path (path through which a signal is transmitted between the power supply circuit 12 and the antenna electrodes AP and AN) which connects the power supply circuit 12 and the antenna electrodes AP and AN is referred to as a "power supply system path". The communication system path 41 includes not only various types of signal lines (wiring patterns) which are connected between the communication circuit 21 and the antenna electrodes AP and AN but also the matching circuits 14, 16, and 17, the switch unit 18, and the like which are connected to the signal lines. In addition, the communication system path 41 includes a reception signal path LRx for supplying a signal received by the antenna 11 to the communication circuit 21 through the antenna electrodes AP and AN, and a transmission signal path LTx for supplying a signal transmitted from the communication circuit 21 to the antenna 11 through the antenna electrodes AP and AN. The reception signal path LRx includes the matching circuit 14, the switch unit 18, and the matching circuit 16, and various types of signal lines (wiring patterns) which connect the circuits and the unit to each other. The transmission signal path LTx includes the matching circuit 14, the switch unit 18, and the matching circuit 17, and various types of signal lines (wiring patterns) which connect the circuits and the unit to each other. The power supply system path 42 includes not only various types of signal lines (wiring patterns) connected between the power supply circuit 12 and the antenna electrodes AP and AN but also the matching circuits 14 and 15 which are connected to the signal lines, and the like.

The communication circuit 21 performs NFC communication with the power transmission side device 3 through the antenna 11. Specifically, the communication circuit 21 includes a communication unit (CM_CIR) 210, a memory unit (MRY) 211, and a control unit (CNT_CIR) 212. The communication unit 210 performs the transmission and reception of a signal through NFC communication. For example, the communication unit 210 inputs a signal received by the antenna 11 from an external terminal Rxp on the positive side and an external terminal Rxn on a negative side at the time of receiving data through NFC communication, converts the input analog signal into a digital signal, and gives the converted signal to the control unit 212. In addition, the communication unit 210 converts data (digital signal) given by the control unit 212 into an analog signal at the time of transmitting data through NFC communication, and outputs the converted data from an external terminal Txp on the positive side and an external terminal Txn on the negative side. The control unit 212, which is configured by, for example, a central processing unit (CPU), executes a program to thereby generate data to be transmitted through NFC communication and to process various pieces of data based on received data. The memory unit 211 includes a ROM, a RAM, and the like. The ROM stores a program executed by the central processing unit. The RAM is used in a work area for arithmetic processing performed by the central processing unit, and the like. Although not particularly limited, the communication circuit 21 is a semiconductor device of a ball grid array (BGA) type package in which a semiconductor chip formed on a semiconductor substrate such as one made of a single crystal silicon by a known technique for manufacturing a CMOS integrated circuit, is sealed by an insulating resin such as a mold resin.

The matching circuits 14 and 15 are circuits for matching impedance between the antenna 11 and the power supply circuit 12. The matching circuits 14, 16, and 17 are circuits for matching impedance between the antenna 11 and the communication circuit 21. The matching circuits 14 to 17 are configured to include, for example, a capacitive element or an inductor. For example, the matching circuit 14 includes capacitive elements CP1 and CN1 which are connected in series between the power supply circuit 12 and the antenna terminals AP and AN, and the matching circuit 15 includes capacitive elements CP2 and CN2 which are connected in series between the power supply circuit 12 and the antenna terminals AP and AN. The matching circuit 16 includes capacitive elements CP3 and CN3 which are connected in series between the antenna terminals AP and AN and the external terminals Rxp and Rxn of the communication circuit 21. The matching circuit 17 includes capacitive elements CP4 and CN4 which are connected in series between the antenna terminals AP and AN and the external terminals Txp and Txn of the communication circuit 21, and a capacitor CT connected between the transmission terminals Txp and Txn. Although described in detail later, electrodes TCP and TCN for connecting the capacitor CT and a variable capacitor (trimmer capacitor) CTX in parallel are formed on the transmission signal path LTx. Meanwhile, the matching circuits 14 to 17 are not limited to the circuit configuration illustrated in FIG. 1, and various modifications can be made in order to obtain desired characteristics.

The power supply circuit 12 generates various types of DC voltages on the basis of an AC signal received through the antenna 11, and performs control for supplying the generated DC voltages to each functional unit in the power reception side device 2. Specifically, the power supply circuit 12 includes a rectifier circuit (RECT_CIR) 19, a capacitor CRECT, a voltage control unit 22, and a detection unit (SEN) 25.

The rectifier circuit 19 rectifies an AC signal obtained through the antenna 11 and outputs the rectified signal to a node ND1. Although not particularly limited, the rectifier circuit 19 is a bridge type full-wave rectifier circuit which is constituted using four rectifier diodes. The capacitor CRECT is a stabilized capacitor connected between the node ND1 and a ground node. Thereby, a voltage (voltage of the node ND1) which is rectified by the rectifier circuit 19 is smoothened.

The detection unit 25 detects the voltage level of a signal supplied to the rectifier circuit 19.

The voltage control unit 22 generates a stable DC voltage on the basis of a voltage of the node ND1, and performs the supply of operation power of the internal circuit 24, the supply of a charging voltage to the battery 13, the supply of operation power of the communication circuit 21, and the like. The voltage control unit 22 is configured to include the power supply IC 20, and a capacitor COUT, a coil 23, and the like which are externally mounted to the power supply IC 20. Although not particularly limited, the power supply IC 20 is a semiconductor device of a BGA type package in which a semiconductor chip formed on a semiconductor substrate such as one single crystal silicon by a known technique for manufacturing a CMOS integrated circuit is sealed by an insulating resin such as a mold resin. The power supply IC 20 includes a voltage generation unit 201, a selector (SEL) 204, a charging control circuit (CHG_CNT) 205, a control unit (CNT_CIR) 206, and an NFC power supply unit (NFC_VREG) 207.

The voltage generation unit 201 includes a switching regulator controller unit (SWREG) 202 and a series regulator (low drop out: LDO) 203. The series regulator 203 steps down a voltage supplied to the node ND1 and outputs the stepped-down voltage. The switching regulator controller unit 202 realizes a DC/DC converter such as, for example, a switching regulator together with the capacitor COUT and the coil 23 which are externally mounted to the power supply IC 20.

Figure 2:
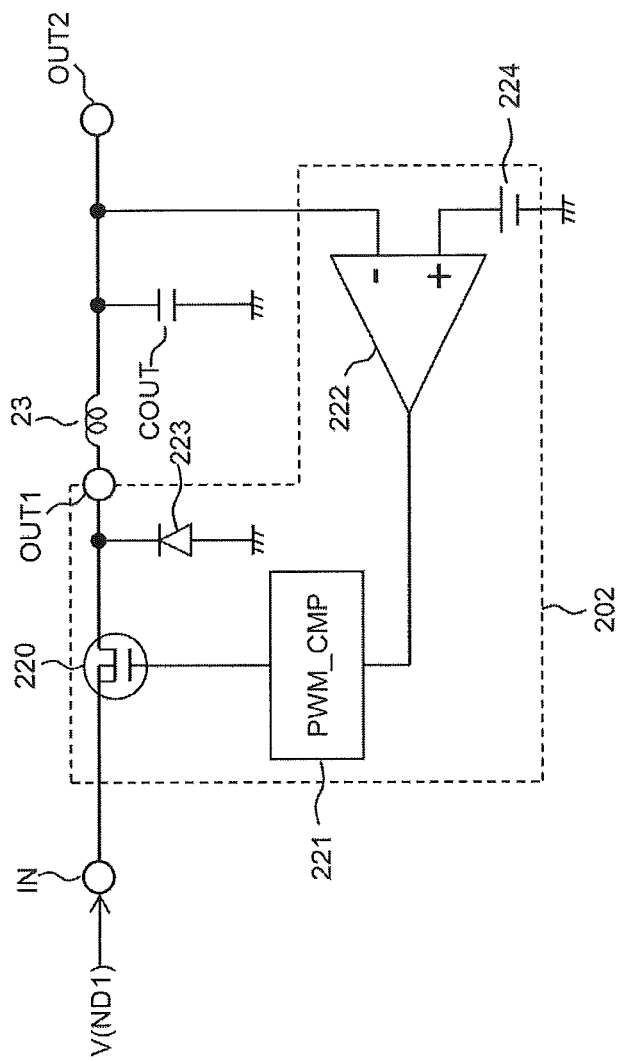
FIG. 2 is a block diagram illustrating a step-down type switching regulator which is constituted by a power supply IC 20, an external capacitor COUT, and a coil 23.

FIG. 2 illustrates a step-down type switching regulator which is constituted by the power supply IC 20, the external capacitor COUT, and the coil 23. As illustrated in the drawing, the switching regulator controller unit 202 includes an error amplifier 222, a PWM comparator 221, a reference voltage 224, a diode 223, and a switching transistor 220. The coil 23 is connected between an external terminal OUT1 and an external terminal OUT2 of the power supply IC 20, and an output capacitor COUT is connected between the external terminal OUT2 and a ground node. The switching transistor 220 is disposed between an external terminal IN of the power supply IC 20 connected to the node ND1 and the external terminal OUT1. The error amplifier 222 generates an error voltage based on a difference between a voltage of the external terminal OUT2 and the reference voltage 224. The PWM comparator 221 generates a PWM signal having a pulse width based on the error voltage. The switching transistor 220 is switched by the PWM signal. Thereby, a current flowing to the coil 23 is switched, and a DC voltage obtained by stepping down the voltage of the node ND1 is generated in the external terminal OUT2.

The selector 204 selects either of a DC voltage generated by the LDO 203 and a DC voltage which is output to the external terminal OUT2 by the switching regulator controller unit 202, and outputs the selected voltage. A voltage which is output from the selector 204 is supplied to each of, for example, the charging control circuit 205, the internal circuit 24, and the NFC power supply unit 207. The charging control circuit 205 charges the battery 13 on the basis of the output voltage of the selector 204. The NFC power supply unit 207 generates an operation power supply of the communication circuit 21. The control unit 206 performs the overall control of the power supply IC 20 and controls the switch unit 18 in accordance with a detection result of the detection unit 25.

The switch unit 18 includes a switch circuit SWP provided between the antenna electrode AP and the external terminals Rxp and Txp of the communication circuit 21, and a switch circuit SWN provided between the antenna electrode AN and the external terminals Rxn and Txn of the communication circuit 21. In case that communication is performed through the antenna 11, the switch circuits SWP and SWN connect the antenna electrodes AP and AN and the communication circuit 21. On the other hand, in case that the power supply circuit 22 generates a DC voltage on the basis of an AC signal received by the antenna 11, the switch circuits SWP and SWN disconnect the antenna electrodes AP and AN and the communication circuit 21 from each other. More specifically, the control unit 206 monitors a detection result of the detection unit 25, and turns off the switch circuits SWP and SWN in case that it is determined that the power of a signal received by the antenna 11 has exceeded a predetermined threshold value and turns on the switch circuits SWP and SWN in case that it is determined that the power of the signal has not exceeded the predetermined threshold value. Thereby, it is possible to prevent a signal having a great power from being applied to the communication circuit 21 to thereby break the communication circuit 21 during the power supply operation of the power supply circuit 12.

<Summary of Mounting Board of Communication Control Device>

Figure 3:
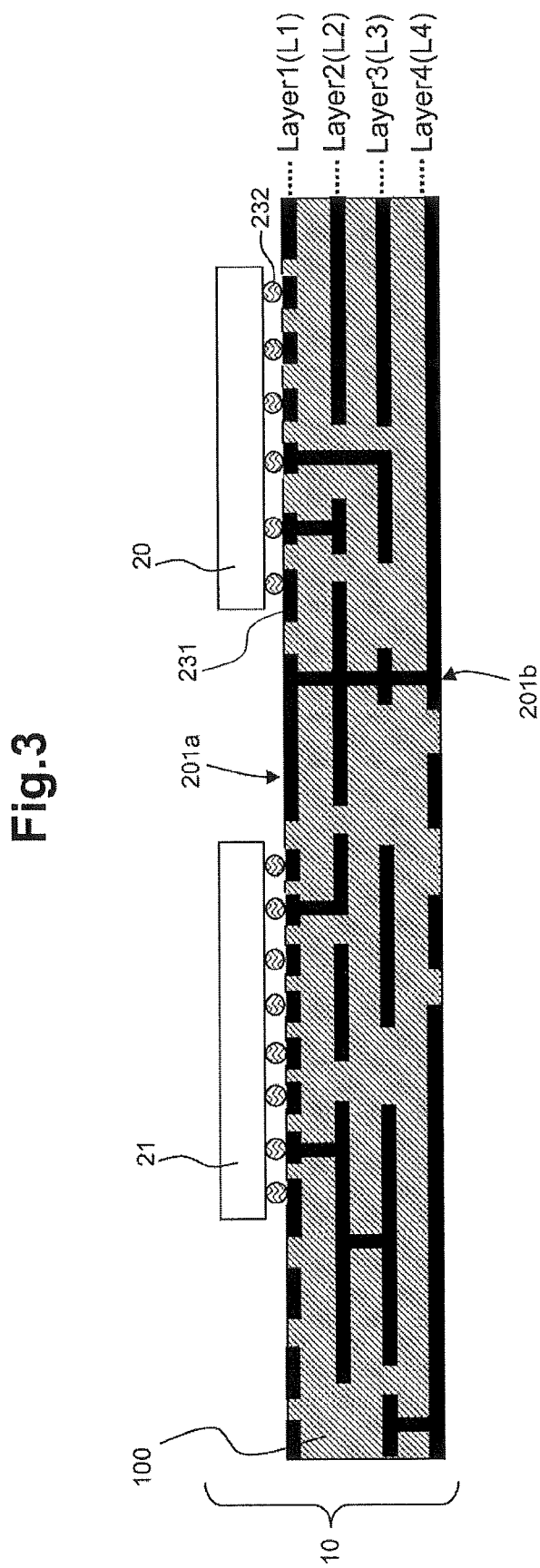
FIG. 3 is a diagram illustrating a schematic cross section of a mounting board 100 constituting a communication control device 10.

FIG. 3 is a diagram illustrating a schematic cross section of the mounting board 100 constituting the communication control device 10.

The mounting board 100, having a multiphase wiring substrate structure, is a build-up substrate in which a plurality of conductive layers are formed on an insulating substrate that uses, for example, glass fiber cloth as a base material and is impregnated with an epoxy resin. In the drawing, the mounting board 100 having four conductive layers of a first conductive layer (Layer1 (L1)) to a fourth conductive layer (Layer4 (L4)) is illustrated as an example, but the number of conductive layers is not particularly limited. Copper (Cu), aluminum (Al), or the like can be adopted as a metal member of a wiring pattern formed in the conductive layers L1 to L4.

Specifically, the mounting board 100 has a first principal surface (front face) 201a constituted by the conductive layer L1 on which electronic components such as the power supply IC 20, the communication circuit 21, and the coil 23 are mounted, and a second principal surface (rear face) 201b, constituted by the conductive layer L4, which faces the first principal surface 201a. In addition, the mounting board 100 includes second and third conductive layers L2 and L3 between the first principal surface 201a and the second principal surface 201b.

Although not particularly limited, the mounting board 100 is configured as a one-side mounting substrate having, for example, the first principal surface 201a (front face) as a mounting surface. A region for mounting various types of electronic components, an electrode 231 for the electrical connection to the various types of electronic components through solder bumps 232, a signal line (wiring pattern) for electrically connecting the electronic components, and the like, are formed in the first conductive layer L1. Accordingly, various types of electronic components constituting the communication control device 10 are formed to be concentrated on one side of the mounting board, and thus it is possible to form a thin communication module compared to a case where the electronic components are mounted on both sides of the mounting board. In addition, components are not mounted on the rear face (second principal surface 201b) of the mounting surface, and thus the arrangement of the power reception side device 2 within a housing (screwing to the housing, or the like) with the second principal surface 201b as a contact surface (supporting surface) is facilitated, and solder reflow is also facilitated.

<Layout Arrangement of Component in Mounting Board>

In case that the battery 13 is charged through wireless power supply in the communication control device 10, the communication control device 10 first performs NFC communication with the power transmission side device 3 to exchange residual amount information of a battery or various pieces of information for wireless power supply, and determines the amount of power to be transmitted by the power transmission side device 3. Thereafter, an AC signal based on the determined amount of power is transmitted from the power transmission side device 3, and the power reception side device 2 receives power from the AC signal and charges the battery 13. Since an AC signal having a great amount of power is input to the power reception side device 2 through an antenna during the charging of the battery 13, an increase in voltage is detected by the detection unit 25 to turn off the switch unit 18, and thus a high power signal is prevented from being input to the communication circuit 21, thereby protecting the communication circuit 21. On the other hand, an AC signal having a relatively small amount of power is transmitted from the power transmission side device 3 during NFC communication, and the power supply circuit 12 generates a voltage on the basis of the AC signal. At this time, the communication circuit 21 operates using the voltage generated by the power supply circuit 12 as operation power, and thus the NFC communication is realized. During the NFC communication, the rectifier circuit 19 (an input line of the rectifier circuit 19, a signal wiring within the rectifier circuit 19, or the like) which is supplied with the AC signal in the power supply circuit 12 becomes the greatest noise source. For this reason, noise is propagated to the communication system path 41 and the communication circuit 21 from the rectifier circuit 19, the signal wiring connected to the rectifier circuit, or the like, and thus there is a concern of an adverse effect being exerted on the communication characteristics of the communication circuit 21. Consequently, in the communication control device 10 according to this embodiment, a layout arrangement for suppressing the propagation of noise to the communication system path 41 and the communication circuit 21 from the power supply circuit 12 in the mounting board 100 is performed as follows.

Figure 4:
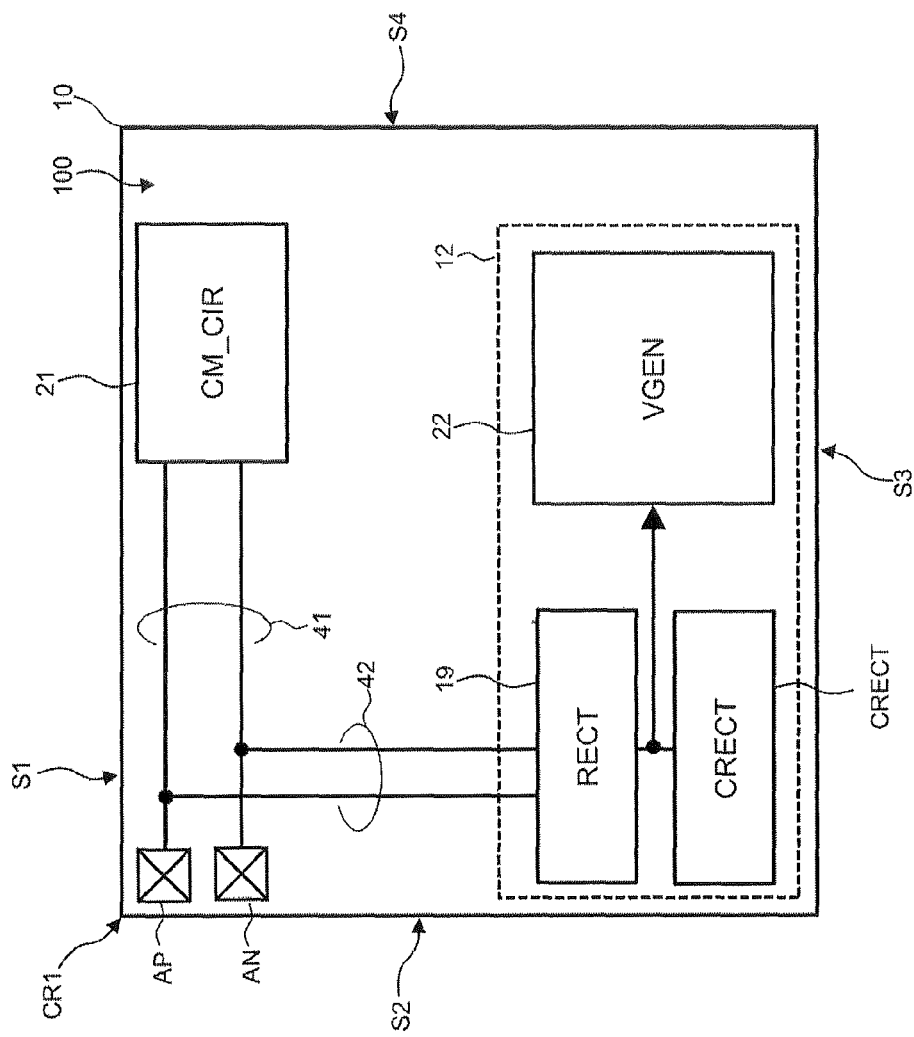
FIG. 4 is a diagram illustrating the outline of a layout arrangement of the mounting board 100 according to the first embodiment.

FIG. 4 is a diagram illustrating the outline of a layout arrangement of the mounting board 100 according to the first embodiment.

As illustrated in the drawing, the antenna electrodes AP and AN are disposed at one corner portion CR1 on the first principal surface 201a of the mounting board 100. The communication circuit 21 is disposed on the side of a side S1 that shares the corner portion CR1, and the power supply circuit 12 is disposed on the side of a side S3 facing the side S1. In addition, the communication system path 41 extends along the side S1, and the power supply system path 42 extends along a side S2 that shares the corner portion CR1 and is perpendicular to the side S1.

If the power supply system path 42 and the communication system path 41 are formed to be parallel to each other, a magnetic field generated in the power supply system path 42 is interlinked with the communication system path 41, and noise current flows to the communication system path 41. On the other hand, according to the layout arrangement of FIG. 4, the magnetic field generated from the power supply system path 42 is not interlinked with the communication system path 41, and thus it is possible to suppress noise from the power supply system path 42 to the communication system path 41, which makes the communication circuit 21 less likely to be influenced by noise from the power supply circuit 12. In addition, it is possible to reduce the area of the substrate compared to a case where the communication system path 41 and the power supply system path 42 are simply formed to be separated from each other in order to suppress the influence of noise. This will be described in detail with reference to FIGS. 5 to 9.

Figure 5:
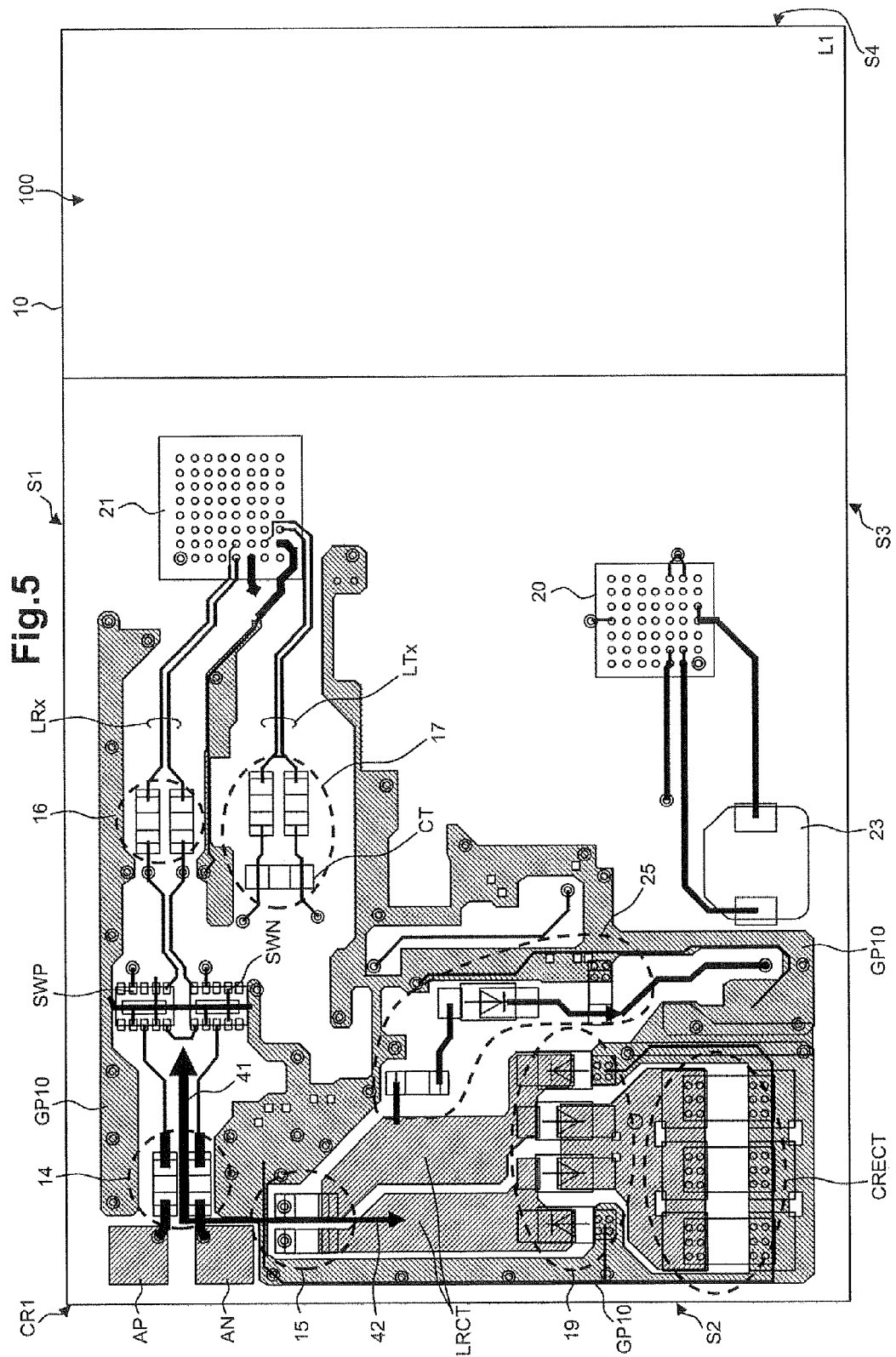
FIG. 5 is a plan view illustrating a conductive layer L1 of the mounting board 100.
Figure 6:
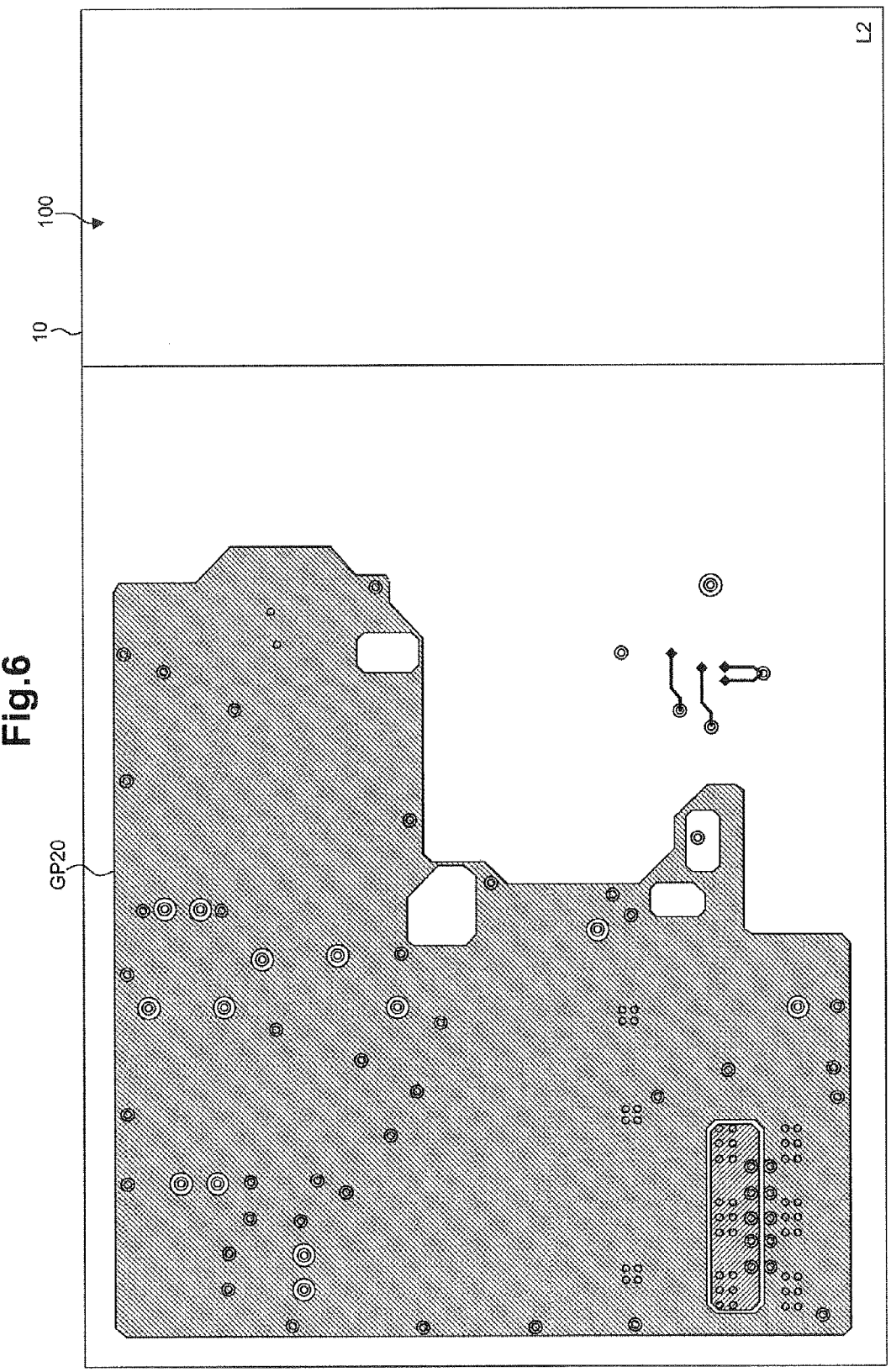
FIG. 6 is a plan view illustrating a conductive layer L2 of the mounting board 100.
Figure 7:
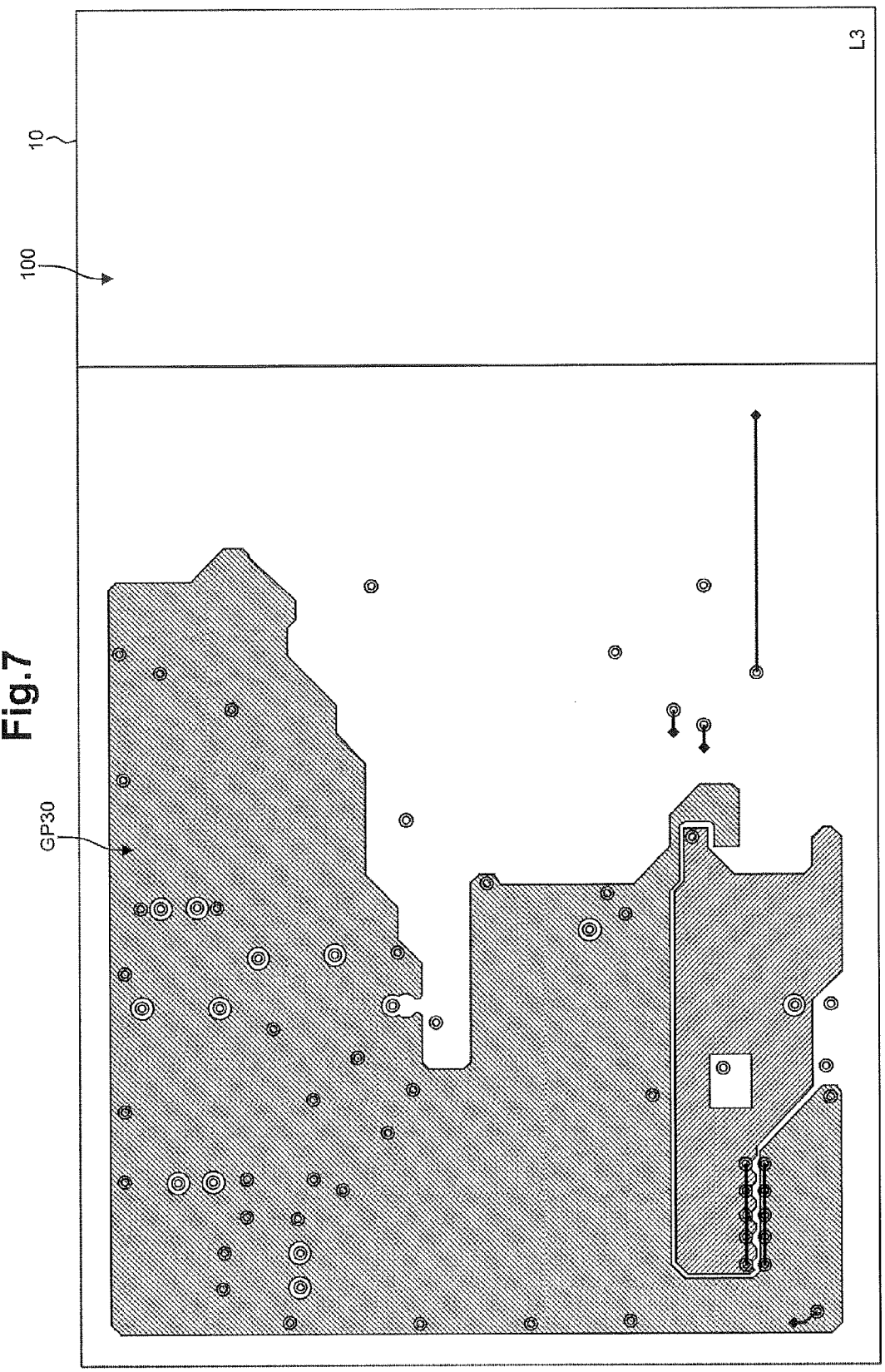
FIG. 7 is a plan view illustrating a conductive layer L3 of the mounting board 100.
Figure 8:
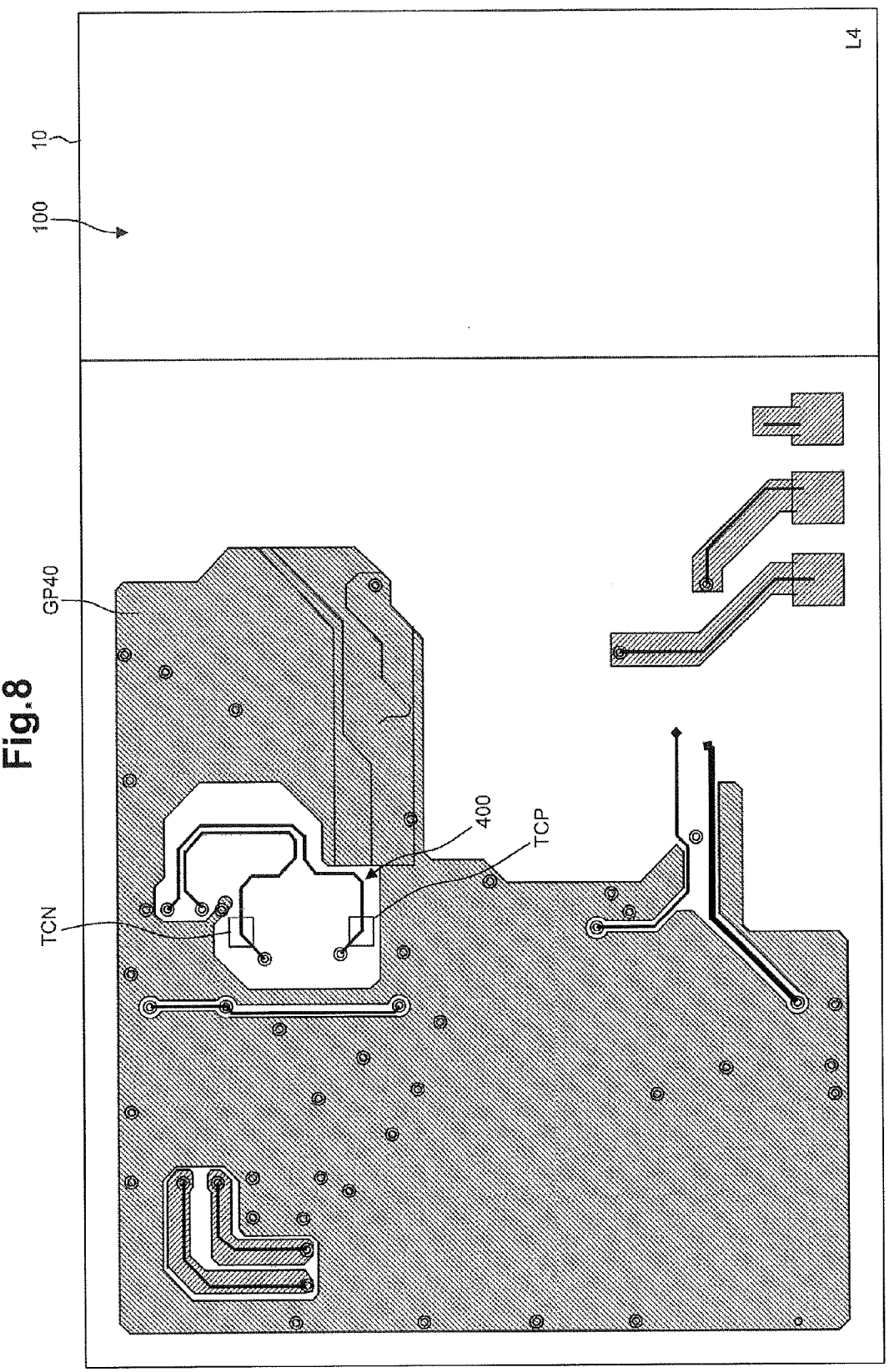
FIG. 8 is a plan view illustrating a conductive layer L4 of the mounting board 100.
Figure 9:
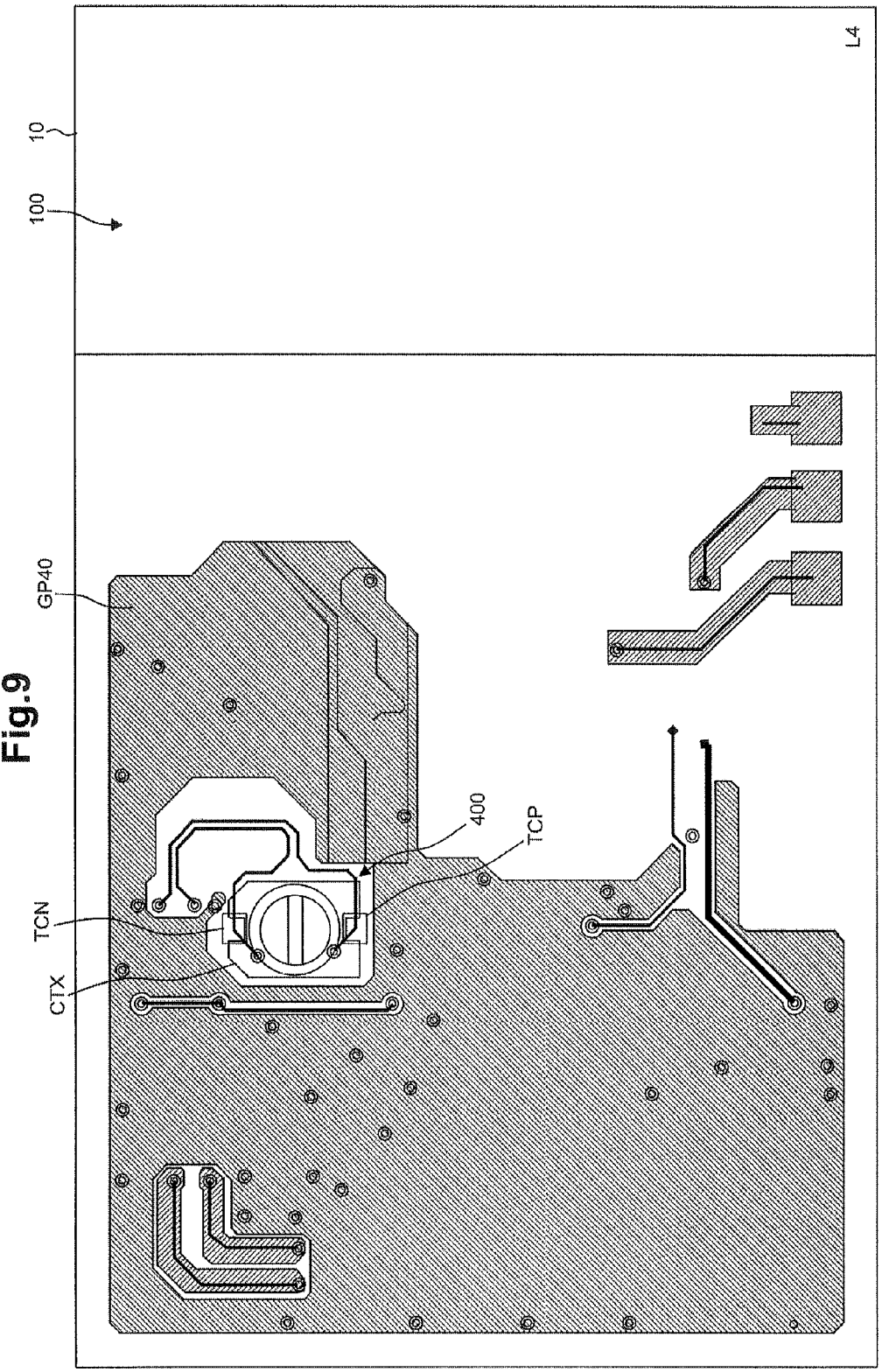
FIG. 9 is a plan view illustrating the conductive layer L4 of the mounting board 100 in case that a trimmer capacitor CTX is connected thereto.

FIG. 5 is a plan view illustrating the conductive layer L1 of the mounting board 100, FIG. 6 is a plan view illustrating the conductive layer L2 of the mounting board 100, and FIG. 7 is a plan view illustrating the conductive layer L3 of the mounting board 100. In addition, FIG. 8 is a plan view illustrating the conductive layer L4 of the mounting board 100, and FIG. 9 is a plan view illustrating the conductive layer L4 of the mounting board 100 in case that the trimmer capacitor CTX is connected thereto. Meanwhile, for convenience of description and ease of understanding, only portions necessary for description such as wiring patterns, circuit components, and the like which are formed in the vicinity of the antenna electrodes AP and AN, the communication circuit 21, and the power supply IC 20 are shown in FIGS. 5 to 8, and the other portions are not shown in the drawing.

As illustrated in FIG. 5, the antenna electrodes AP and AN, the power supply IC 20 and the coil (inductor) 23 which constitute the power supply circuit 12, the communication circuit 21, the matching circuits 14, 16, and 17, the switch unit 18, and various wiring patterns which constitute the communication path 41, and the matching circuit 15 and various wiring patterns which constitute the power supply system path 42 are formed in the conductive layer L1 constituting the first principal surface 201a.

As illustrated in FIG. 5, the antenna electrodes AP and AN are disposed at the corner portion CR1 so as to be lined up along the side S2. The switch unit 18, the matching circuits 16 and 17, and the communication circuit 21 are disposed on the side of the side S1. The communication system path 41 is formed so as to be extended in a direction of the side S4 along the side S1 with the antenna electrodes AP and AN as reference points. The rectifier circuit 19, the capacitor CRECT, the detection unit 25, the coil 23, and the power supply IC 20 are disposed on the side of the side S3.

The rectifier circuit 19 and the capacitor CRECT are disposed along the side S2, and the voltage control unit 22 is disposed in a direction of the side S4 facing the side S2 so as to be separated from the rectifier circuit 19 and the capacitor CRECT. In addition, the power supply system path 42 is formed so as to extend in a direction of the side S3 along the side S2 with the antenna electrodes AP and AN as reference points. The power supply system path 42 includes, for example, the matching circuit 15, and a wiring pattern LRCT connecting the matching circuit 15 and the rectifier circuit 19. Accordingly, it is possible to effectively prevent noise from being propagated to the communication circuit 21 and the communication system path 41 from the rectifier circuit 19 that may become the greatest noise source and the input line thereof. In addition, the rectifier circuit 19 and the voltage control unit 22 are disposed as described above, and thus it is possible to further reduce the area of the substrate.

The detection unit 25 is formed in a region interposed between the communication system path 41 and the power supply system path 42. Thereby, it is possible to effectively utilize the region.

A ground pattern (ground plane) for connection to a ground potential is formed in a region other than a region in which electronic components and a wiring pattern connecting the electronic components are formed. For example, as illustrated in FIG. 5, a ground pattern GP10 is formed in the vicinity of the communication system path 41 and the power supply system path 42 in the conductive layer L1. The ground pattern GP10 is formed so as to surround, for example, semiconductor devices such as the communication circuit 21 and the power supply IC 20 and the other electronic components, signal wirings, and electrodes. In addition, as illustrated in FIG. 6, a ground pattern GP20 is formed in the conductive layer L2 which is adjacent to the conductive layer L1. The ground pattern GP20 is formed so as to overlap, for example, at least portions of the communication system path 41 and the power supply system path 42 formed in the conductive layer L1 when seen in a plan view. Similarly, as illustrated in FIGS. 7 and 8, a ground pattern GP30 for connection to a ground potential and a ground pattern GP40 for connection to a ground potential are formed in the conductive layer L3 and the conductive layer L4, respectively, so as to overlap at least portions of the communication system path 41 and the power supply system path 42 when seen in a plan view.

<Reception Signal Path LRx Formed in Single Conductive Layer>

As described above, the communication system path 41 includes the reception signal path LRx and the transmission signal path LTx. The reception signal path LRx is formed so as to connect the communication circuit 21 and the antenna electrodes AP and AN without passing through the conductive layers L2 to L4 other than the conductive layer L1. Specifically, as illustrated in FIGS. 5 to 8, the antenna electrodes AP and AN and the external terminals Rxp and Rxn of the communication circuit 21 are connected to each other through the matching circuit 14, the switch circuits SWP and SWN, and the matching circuit 16 which are disposed on the conductive layer L1, and a wiring pattern, formed in the conductive layer L1, which connects the circuits to each other. Accordingly, the generation of a discontinuous point of impedance due to a parasitic resistance, a parasitic capacitance, and a parasitic inductance which are formed in a signal path between the communication circuit 21 and the antenna electrodes AP and AN can be suppressed, and thus it is possible to suppress the deterioration of a reception signal supplied to the communication circuit 21 and to improve the communication characteristics of the communication control device 10.

Preferably, the transmission signal path LTx is formed in a single conductive layer similar to the reception signal path LRx. However, the transmission signal path LTx is formed through a conductive layer other than the conductive layer L1 from a difficulty in forming both the reception signal path LRx and the transmission signal path LTx in a single conductive layer (difficulty in routing wiring). FIGS. 5 to 8 illustrate the transmission signal path LTx formed to be connected to the matching circuit 17 through a wiring pattern formed from a node on a communication circuit side of the switch unit 18 to the conductive layers L2 to L4 as an example.

In many cases, a reception signal received from the communication control device 10 in NFC communication has a lower signal level (power) than that of a transmission signal transmitted from the communication control device 10. For this reason, a configuration in which the reception signal path LRx is formed in a single conductive layer and the transmission signal path LTx is formed across a plurality of conductive layers, as described above, is effective in that the communication characteristics of the communication control device 10 are improved while facilitating the routing of wiring.

<Electrode for Connecting Trimmer Capacitor>

The waveform of a transmission signal transmitted from the communication control device 10 in NFC communication has to have a shape satisfying standards of NFC communication. For this reason, in recent years, a capacity value for obtaining a signal waveform satisfying standards has been determined by adjusting a capacity value of a capacitive element of the matching circuit 17 formed on the transmission signal path LTx after various components are mounted on the mounting board 100 in a step of manufacturing the communication control device 10. For example, an optimal capacity value of a trimmer capacitor has been determined by mounting the trimmer capacitor as one of capacitive elements constituting the matching circuit 17 and confirming a transmission waveform for each capacity value by varying the capacity value of the trimmer capacitor. Alternatively, a capacitive element having an optimal capacity value has been determined by replacing capacitive elements (chip capacitors) constituting the matching circuit 17 soldered to a mounting board to vary a capacity value and confirming a transmission waveform for each capacitive element. However, according to the former method, it is easy to adjust the capacity value of the matching circuit 17, but it is necessary to secure a space for mounting a trimmer capacitor, which is larger than a chip capacitor, on a mounting surface of a mounting board, and thus there is a problem in that the area of the mounting board is increased. In addition, according to the latter method, labor of replacing the chip capacitor by manual work is required.

Consequently, in the mounting board 100 according to this embodiment, as illustrated in FIG. 8, the electrodes TCP and TCN for connecting the capacitive element CT constituting the matching circuit 17 on the transmission signal path LTx and a variable capacitor (trimmer capacitor) in parallel are formed on the conductive layer L4. Accordingly, in a step of manufacturing the communication control device 10, for example, an optimal capacity value of the matching circuit 17 is determined by connecting a trimmer capacitor to the rear face (conductive layer L4), and then the trimmer capacitor is removed from the mounting board, and thus the chip capacitor based on the capacity value can be mounted on the mounting surface (conductive layer L1) as the capacitive element CT of the matching circuit 17. Accordingly, as described above, it is possible to reduce the labor of replacing the chip capacitor by manual work, and thus the adjustment of the capacity value of the matching circuit 17 is facilitated. In addition, as illustrated in FIG. 9, a region 400 for disposing the trimmer capacitor CTX and the electrodes TCN and TCP are formed on the rear face (conductive layer L4), and thus it is not necessary to secure a space for disposing the trimmer capacitor CTX on the mounting surface (conductive layer L1). Thereby, it is possible to reduce the area of the mounting surface, which contributes to a reduction in the size of the mounting board.

As described above, according to the communication control device of the first embodiment, it is possible to achieve a reduction in the size of the communication control device while suppressing the deterioration of the characteristics of the communication control device.

<<Second Embodiment>>

<Ground Pattern in which Slit for Suppressing Noise Propagation is Formed>

A mounting board of a communication control device according to a second embodiment is different from the mounting board according to the first embodiment in that slits are formed in predetermined regions of ground patterns GP10 to GP40. Meanwhile, a circuit configuration of a communication control device 10A according to the second embodiment is the same as that of the communication control device 10 according to the first embodiment, and thus a detailed description thereof will not be repeated.

FIGS. 10 to 13 are plan views illustrating each conductive layer of a mounting board 101 in the communication control device 10A according to the second embodiment.

Figure 10:
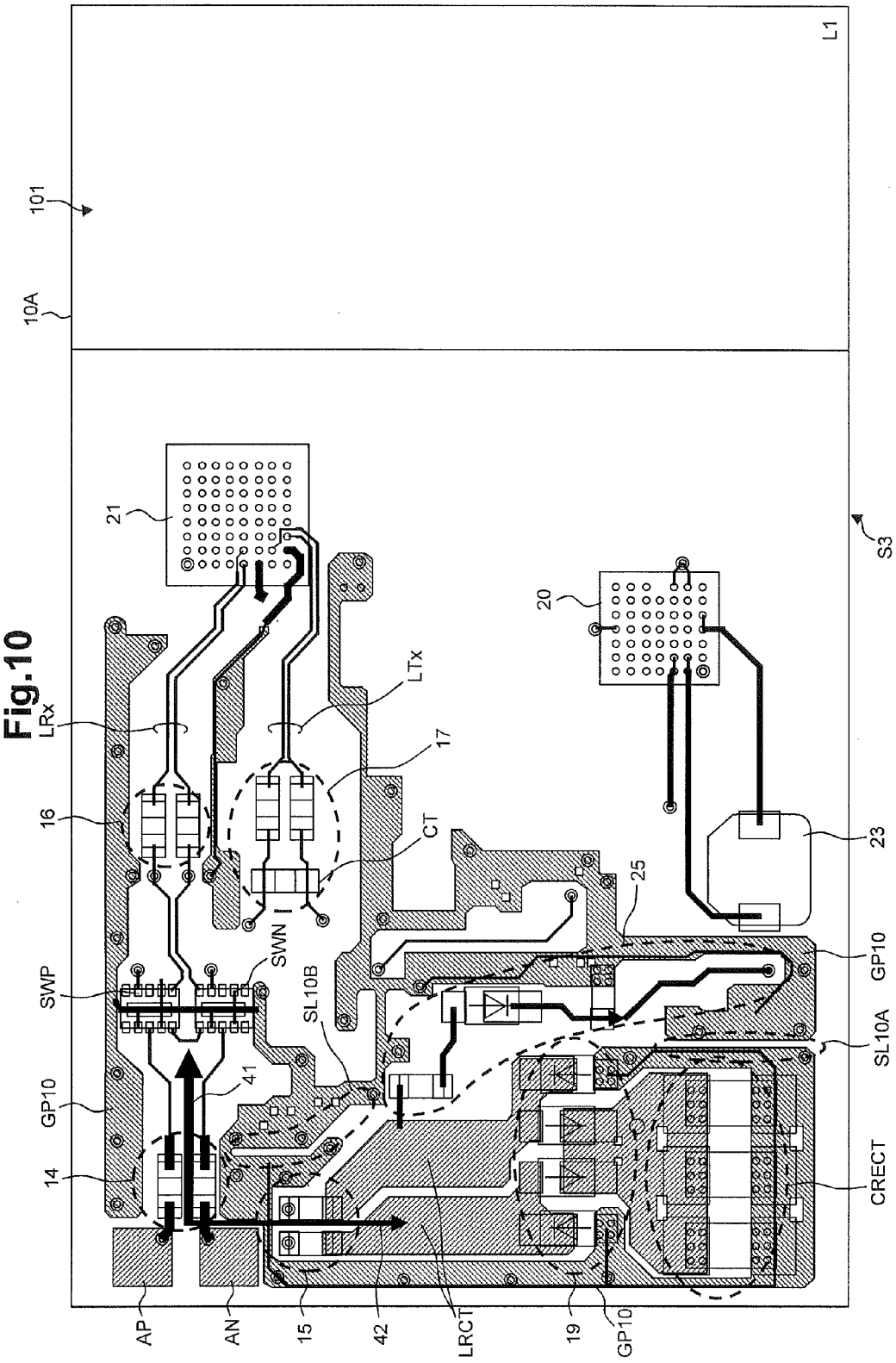
FIG. 10 is a plan view illustrating a conductive layer L1 of a mounting board 101.
Figure 11:
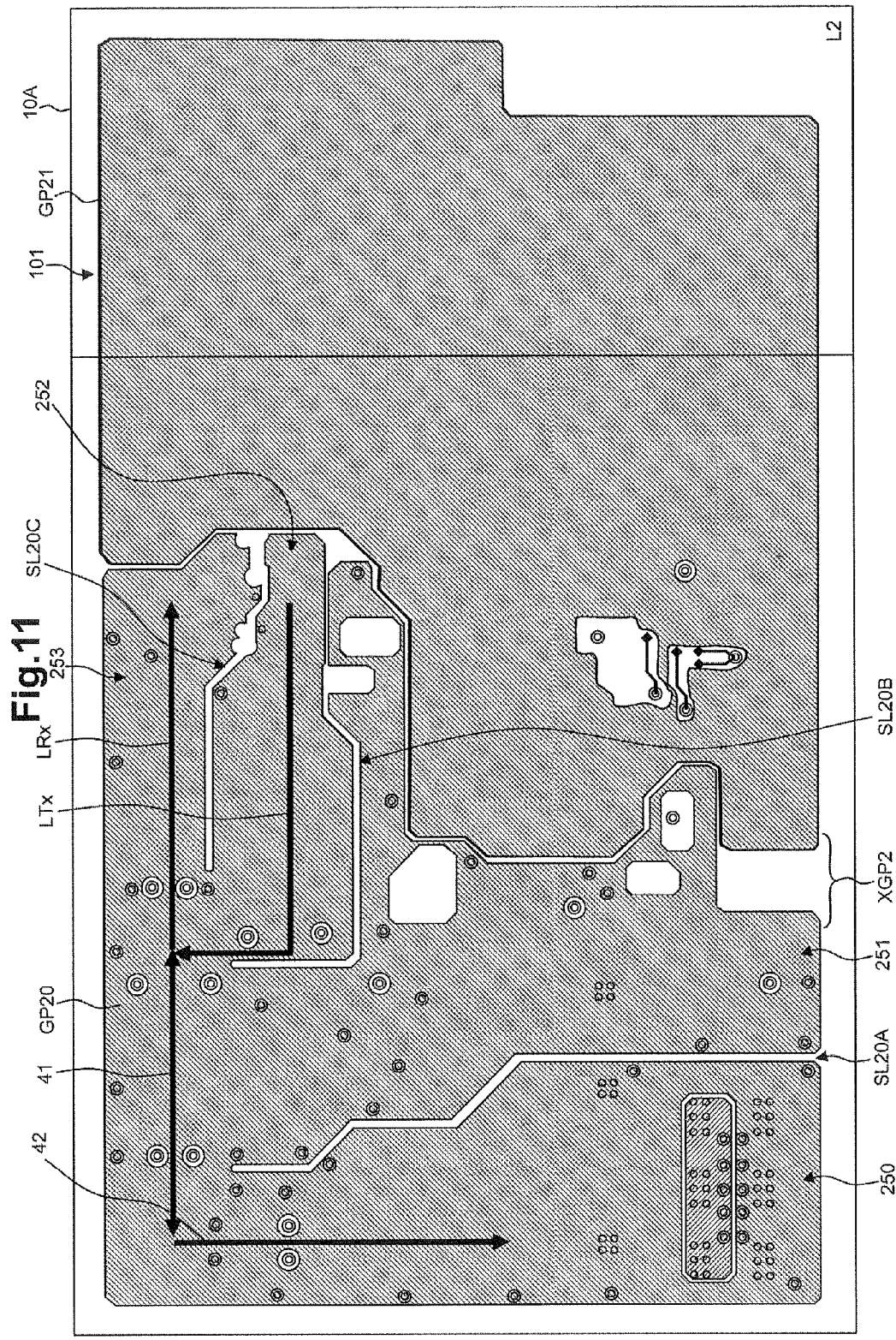
FIG. 11 is a plan view illustrating a conductive layer L2 of the mounting board 101.
Figure 12:
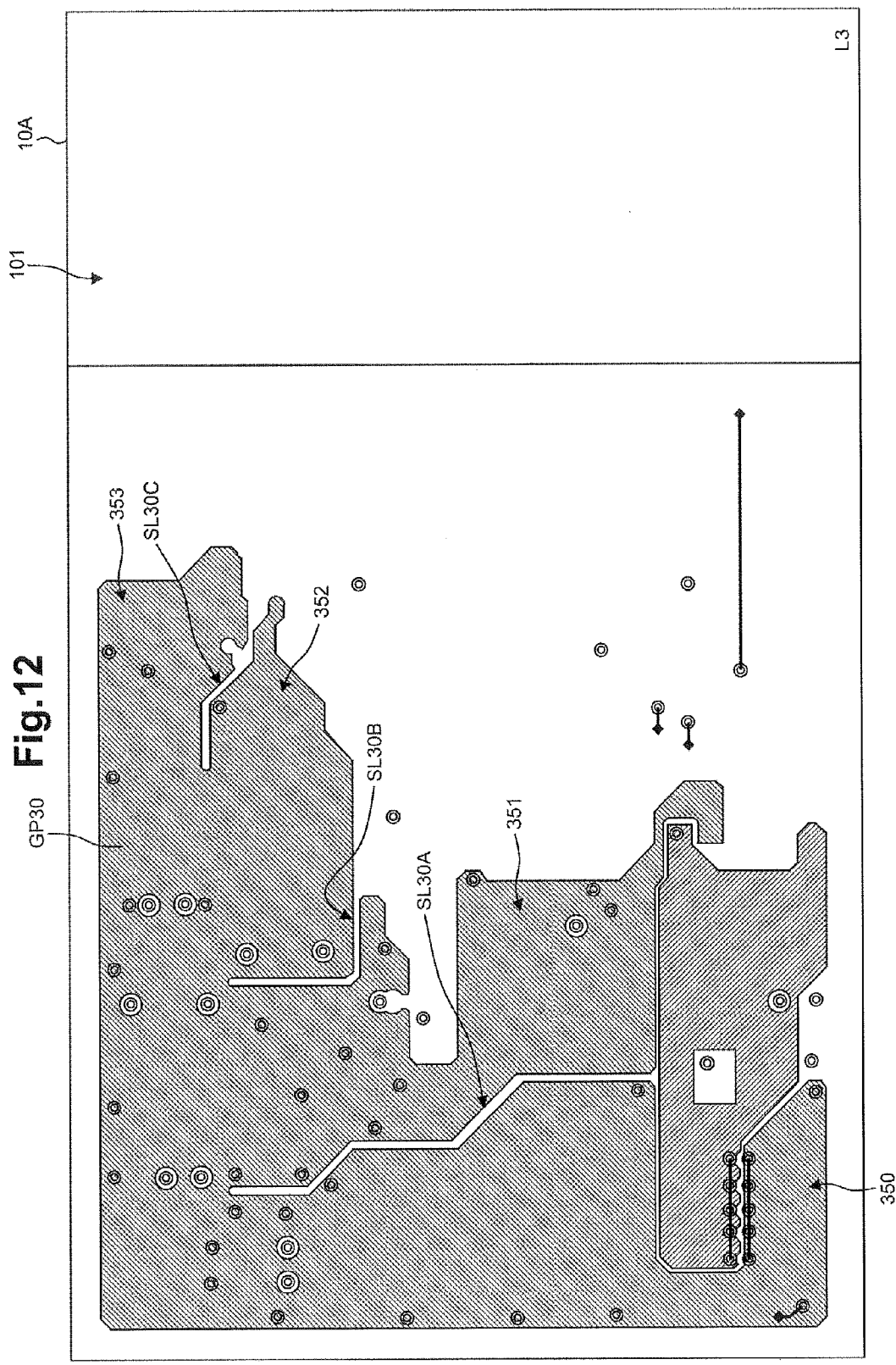
FIG. 12 is a plan view illustrating a conductive layer L3 of the mounting board 101.
Figure 13:
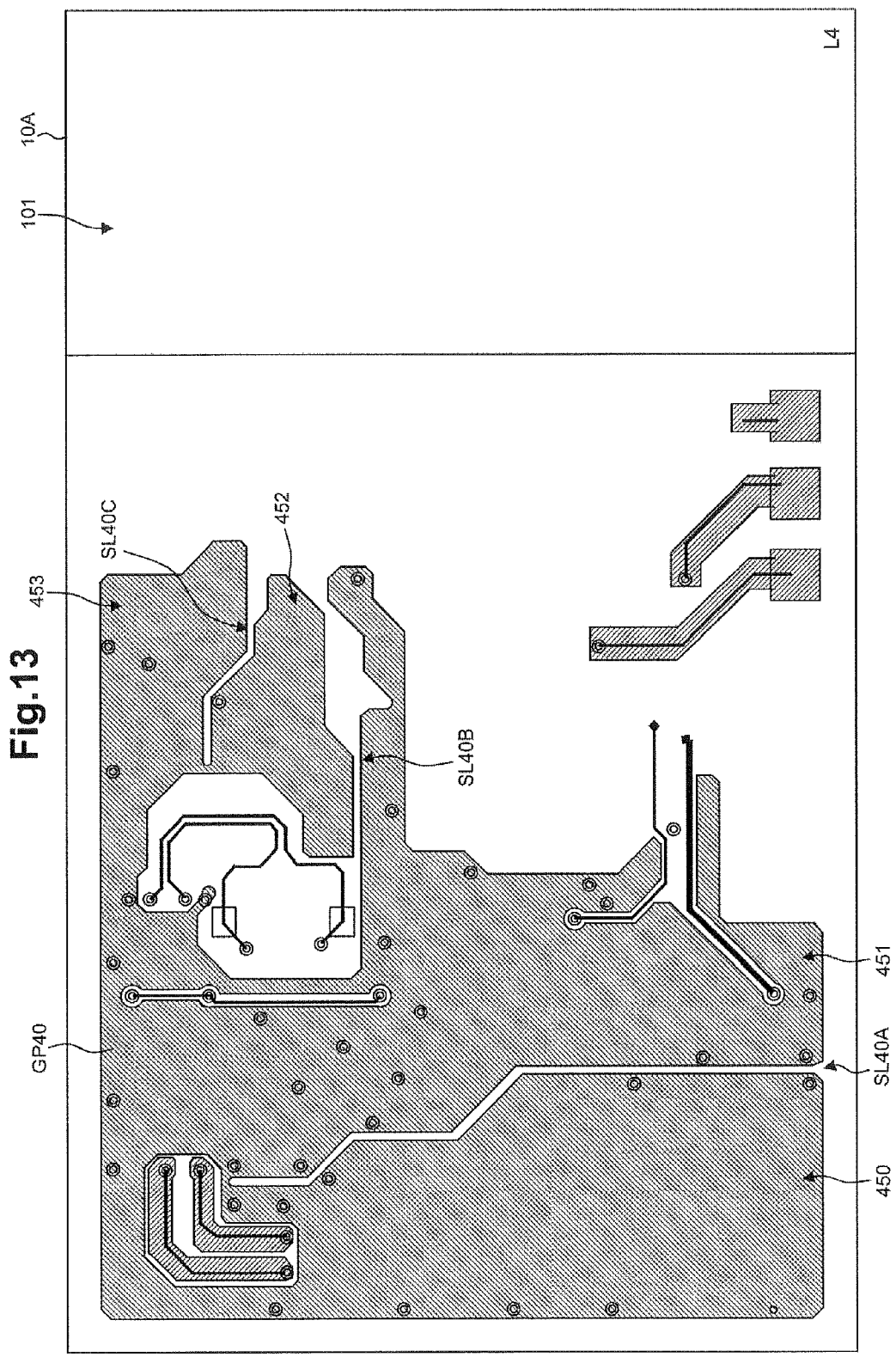
FIG. 13 is a plan view illustrating a conductive layer L4 of the mounting board 101.

FIG. 10 is a plan view illustrating a conductive layer L1 of the mounting board 101, FIG. 11 is a plan view illustrating a conductive layer L2 of the mounting board 101, FIG. 12 is a plan view illustrating a conductive layer L3 of the mounting board 101, and FIG. 13 is a plan view illustrating a conductive layer L4 of the mounting board 101. Meanwhile, for convenience of description and easy understanding, only portions necessary for description such as wiring patterns, circuit components, and the like which are formed in the vicinity of antenna electrodes AP and AN, a communication circuit 21, and a power supply IC 20 are shown in FIGS. 10 to 13, and the other portions are not shown in the drawing.

As illustrated in FIG. 10, in a ground pattern GP10 formed in the conductive layer L1, a slit is formed along at least a portion of a power supply system path 42 in a region interposed between a communication system path 41 and the power supply system path 42. For example, in the ground pattern GP10, a slit SL10A is formed in a region interposed between a matching circuit 19, a capacitor CRECT, and a detection circuit 25, and a slit SL10B is formed in a region interposed between a matching circuit 15, a wiring pattern LRCT, the rectifier circuit 19, the capacitor CRECT, and a switch unit 18. Thereby, it is possible to reduce noise which is propagated to the communication system path 41 and a communication circuit 21 through the ground pattern GP10 from the power supply system path 42.

As illustrated in FIGS. 11 to 13, in ground patterns GP20, GP30, and GP40, a slit is formed along at least a portion of the power supply system path 42 in a region interposed between the communication system path 41 and the power supply system path 42 when seen in a plan view. For example, as illustrated in FIG. 11, in the ground pattern GP30, a slit SL20A is formed between a region 250 overlapping the power supply system path 42 (matching circuit 15, the rectifier circuit 19, and the wiring pattern LRCT) in the conductive layer L1 when seen in a plan view and a region 251 overlapping the detection unit 25 in the conductive layer L1 when seen in a plan view. In addition, as illustrated in FIG. 12, in the ground pattern GP30, a slit SL30A is formed between a region 350 overlapping the power supply system path 42 (matching circuit 15, the rectifier circuit 19, and the wiring pattern LRCT) in the conductive layer L1 when seen in a plan view and a region 351 overlapping the detection unit 25 when seen in a plan view. In addition, as illustrated in FIG. 13, in the ground pattern GP40, a slit SL40A is formed between a region 450 overlapping the power supply system path 42 (matching circuit 15, the rectifier circuit 19, and the wiring pattern LRCT) in the conductive layer L1 when seen in a plan view and a region 451 overlapping the detection unit 25 in the conductive layer L1 when seen in a plan view.

Accordingly, it is possible to reduce noise which is propagated to the communication system path 41 and the communication circuit 21 through the ground patterns GP20, GP30, and GP40 from the power supply system path 42. In particular, considering that there is a tendency for noise to be propagated to the communication circuit 21 and the like through the conductive layer L2 because the ground pattern GP20 of the conductive layer L2 is formed in a wider range than the ground pattern GP10 of the conductive layer L1 and the conductive layer L2 is adjacent to the conductive layer L1, it is effective to form a slit in the ground pattern GP20 of the conductive layer L2 as described above. Thereby, it is possible to effectively suppress the propagation of noise to the communication system path 41.

Further, as illustrated in FIGS. 11 to 13, in the ground patterns GP20, GP30, and GP40, a slit is formed along at least a portion of the communication system path 41 in a region interposed between the communication system path 41 and the power supply system path 42 when seen in a plan view. For example, as illustrated in FIG. 11, in the ground pattern GP20, a slit SL20B is formed between a region 252 overlapping a transmission system signal path LTx (matching circuit 17, and a wiring pattern connecting the matching circuit 17 and external terminals Txp and Txn of the communication circuit 21) in the conductive layer L1 when seen in a plan view and a region 251. In addition, as illustrated in FIG. 12, in the ground pattern GP30, a slit SL30B is formed between a region 352 overlapping the transmission system signal path LTx (matching circuit 17, and the wiring pattern connecting the matching circuit 17 and the external terminals Txp and Txn of the communication circuit 21) in the conductive layer L1 when seen in a plan view and a region 351. In addition, as illustrated in FIG. 13, in the ground pattern GP40, a slit SL40B is formed between a region 452 overlapping the transmission system signal path LTx (matching circuit 17, and the wiring pattern connecting the matching circuit 17 and the external terminals Txp and Txn of the communication circuit 21) in the conductive layer L1 when seen in a plan view and a region 451.

Accordingly, it is possible to further reduce noise which is propagated to the communication system path 41 and the communication circuit 21 through the ground patterns GP20, GP30, and GP40 from the power supply system path 42.

Further, as illustrated in FIGS. 11 to 13, in the ground patterns GP20, GP30, and GP40, a slit is formed along at least a portion of the communication system path 41 in a region interposed between a reception signal path LRx and a transmission signal path LTx when seen in a plan view. For example, as illustrated in FIG. 11, in the ground pattern GP20, a slit SL20C is formed between a region 253 overlapping the reception signal path LRx (matching circuit 16, and a wiring pattern connecting the matching circuit 16 and external terminals Rxp and Rxn of the communication circuit 21) when seen in a plan view and a region 252. In addition, as illustrated in FIG. 12, in the ground pattern GP30, a slit SL30C is formed between a region 353 overlapping the reception signal path LRx when seen in a plan view and a region 352. In addition, as illustrated in FIG. 13, in the ground pattern GP40, a slit SL40C is formed between a region 453 overlapping the reception signal path LRx when seen in a plan view and a region 452. Thereby, it is possible to prevent noise propagation between the reception signal path LRx and the transmission signal path LTx.

Preferably, the width of each of the slits (SL20A and the like) formed in the ground patterns GP20 to GP40 is set to be three times or more as large as a minimum line width of a signal wiring formed on the mounting board 101. For example, as illustrated in FIG. 10, in case that a wiring width of the wiring pattern connecting the matching circuit 17 and the communication circuit 21 in the transmission signal path LTx is set to W, the slit SL20B has a width of equal to or greater than 3W. Thereby, crosstalk between signal lines can be suppressed, and thus it is possible to effectively suppress noise propagation through the ground patterns GP20 to GP40.

<Slit for suppressing Heat Conduction>

As described above, power received by the antenna 11 is converted into a desired voltage by a DC-DC converter (step-down type switching regulator) which is constituted by a power supply IC, and a coil 23, a capacitor COUT, and the like which are externally mounted to the power supply during the power supply of the communication control device 10A, and is used to charge a battery 13. At this time, a large current flows to the coil 23, and thus the amount of heat generated of the coil 23 becomes larger than those of the other electronic components.

Figure 14:
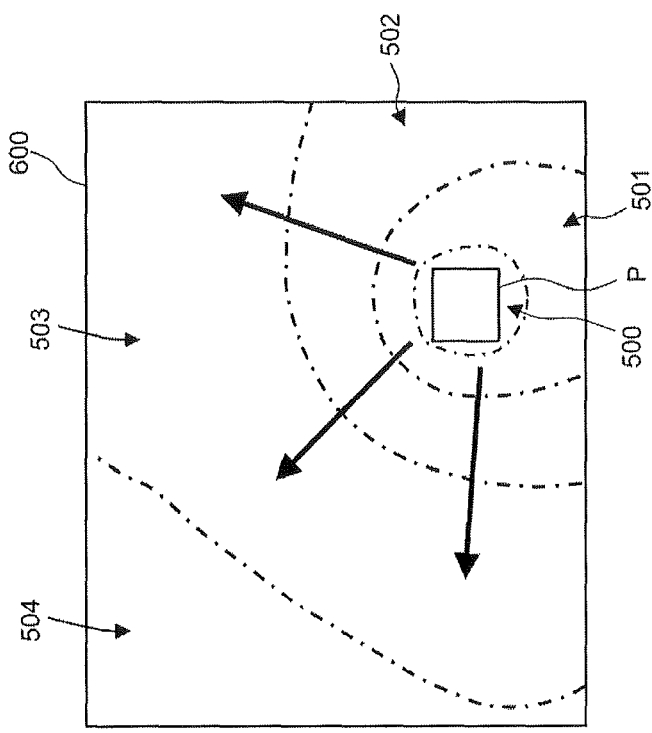
FIG. 14 is a diagram illustrating a tendency of heat conduction in a mounting board.

FIG. 14 is a diagram illustrating a tendency of heat conduction in a mounting board. Reference sign P illustrated in the drawing denotes a heat source which is disposed on a mounting board 600. As illustrated in the drawing, heat generated by the heat source P is concentrically transferred from the heat source P. The temperature of a region 500 closest to the heat source P is highest. as a distance from the heat source P increases, the temperature of a region decreases, like regions 501, 502, 503, and 504. Here, in case that the heat source P is set to be the coil 23, there is a tendency for the power supply IC 20 disposed in the vicinity of the coil 23 to be influenced by heat from the coil 23, and thus there is a concern that the efficiency of power conversion during the supply of power may deteriorate.

Heat tends to be transferred through a metal as generally known. In the case of a mounting board, heat is transferred through a ground pattern formed in a wide range. Consequently, the transfer of heat is suppressed by forming a slit in the ground pattern.

Figure 15:
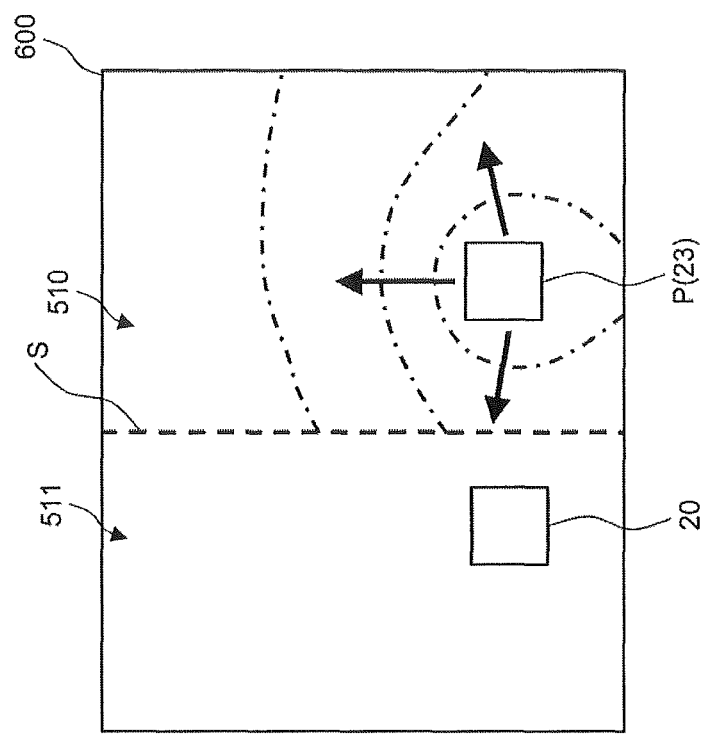
FIG. 15 is a diagram illustrating a tendency of heat conduction in a mounting board in case that a slit is formed in a ground pattern.

FIG. 15 is a diagram illustrating a tendency of heat conduction in case that a slit is formed in a ground pattern of a mounting board. Reference sign S illustrated in the drawing denotes a slit formed in a ground pattern of the mounting board 600. As illustrated in the drawing, heat generated by the heat source P is concentrically transferred from the heat source P, but there is a tendency that heat is not likely to be transferred to a region 511 opposite to a region 510 in which the heat source P is disposed, with the slit as a boundary. For example, even in case that the power supply IC 20 is disposed in the vicinity of the coil 23 in a case where the heat source P is set to be the coil 23, the slit S is formed between the coil 23 and the power supply IC 20 in a ground pattern formed in a conductive layer adjacent to the vicinity of or the top and bottom of the coil 23 and the power supply IC 20, and thus it is possible to make heat generated by the coil 23 less likely to be transferred to the power supply IC 20.

Specifically, in the mounting board 101 according to the second embodiment, as illustrated in FIG. 11, in the conductive layer L2, a ground pattern GP21 overlapping at least a portion of the power supply IC 20 disposed on the conductive layer L1 when seen in a plan view is formed separately from the ground pattern GP20. The ground patterns GP20 and GP21 are disposed so that a region XGP2 having no ground pattern is formed in a range overlapping a region in which the coil 23 is disposed on the conductive layer L1 when seen in a plan view. Accordingly, the ground pattern GP21 does not overlap most of the portion of the coil 23 generating heat, and thus the heat generated by the coil 23 is not likely to be transferred to the power supply IC 20 through the ground pattern GP21. Accordingly, even in case that the power supply IC 20 is disposed in the vicinity of the coil 23, it is possible to prevent the deterioration of characteristics of the power supply IC 20 which is associated with the heat generation of the coil 23 and to suppress the deterioration of the efficiency of power conversion during the supply of power.

As described above, according to the communication control device of the second embodiment, a slit is appropriately formed in a ground pattern formed in each of the conductive layers L1 to L4, and thus it is possible to effectively suppress noise propagation and heat conduction through the ground pattern.

<<Third Embodiment>>

<Power Supply System Path Formed in Single Conductive Layer>

A mounting board of a communication control device according to a third embodiment is different from the mounting board according to the first embodiment in that a power supply system path 42 is formed in a single conductive layer and a communication system path 41 is formed across a plurality of conductive layers. Meanwhile, a circuit configuration of the communication control device according to the third embodiment is the same as that of the communication control device according to the first embodiment, and thus a detailed description thereof will not be repeated.

Figure 16:
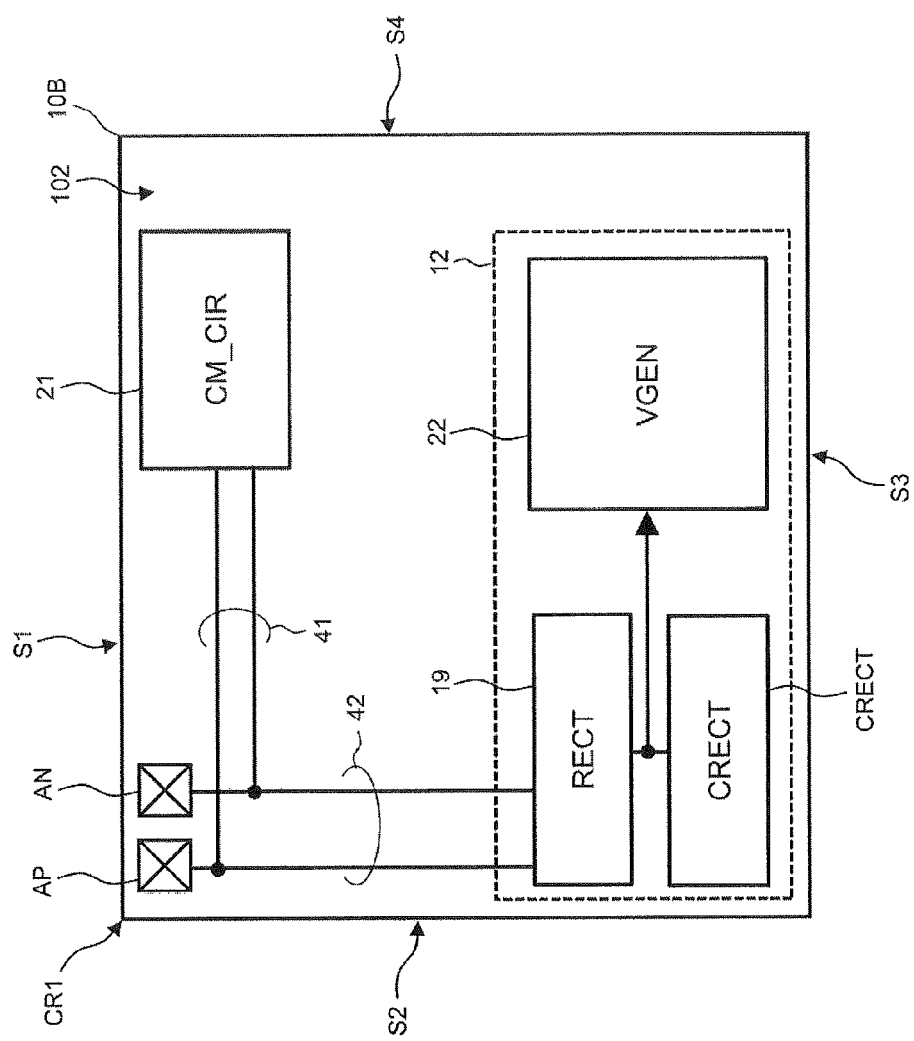
FIG. 16 is a diagram illustrating the outline of a layout arrangement of a mounting board 102 according to a third embodiment.

FIG. 16 is a diagram illustrating the outline of a layout arrangement of amounting board 102 in a communication control device 10B according to the third embodiment. As illustrated in the drawing, antenna electrodes AP and AN are disposed at a corner portion CR1 so as to be lined up along a side S1. The power supply system path 42 is linearly formed so as to be extended in a direction of a side S3 along a side S2 with the antenna electrodes AP and AN as reference points. Here, the term "linearly" as used herein means that a transmission direction of a signal does not change at an angle of equal to or greater than 90 degrees.

A specific layout arrangement will now be described with reference to FIGS. 17 to 20.

Figure 17:
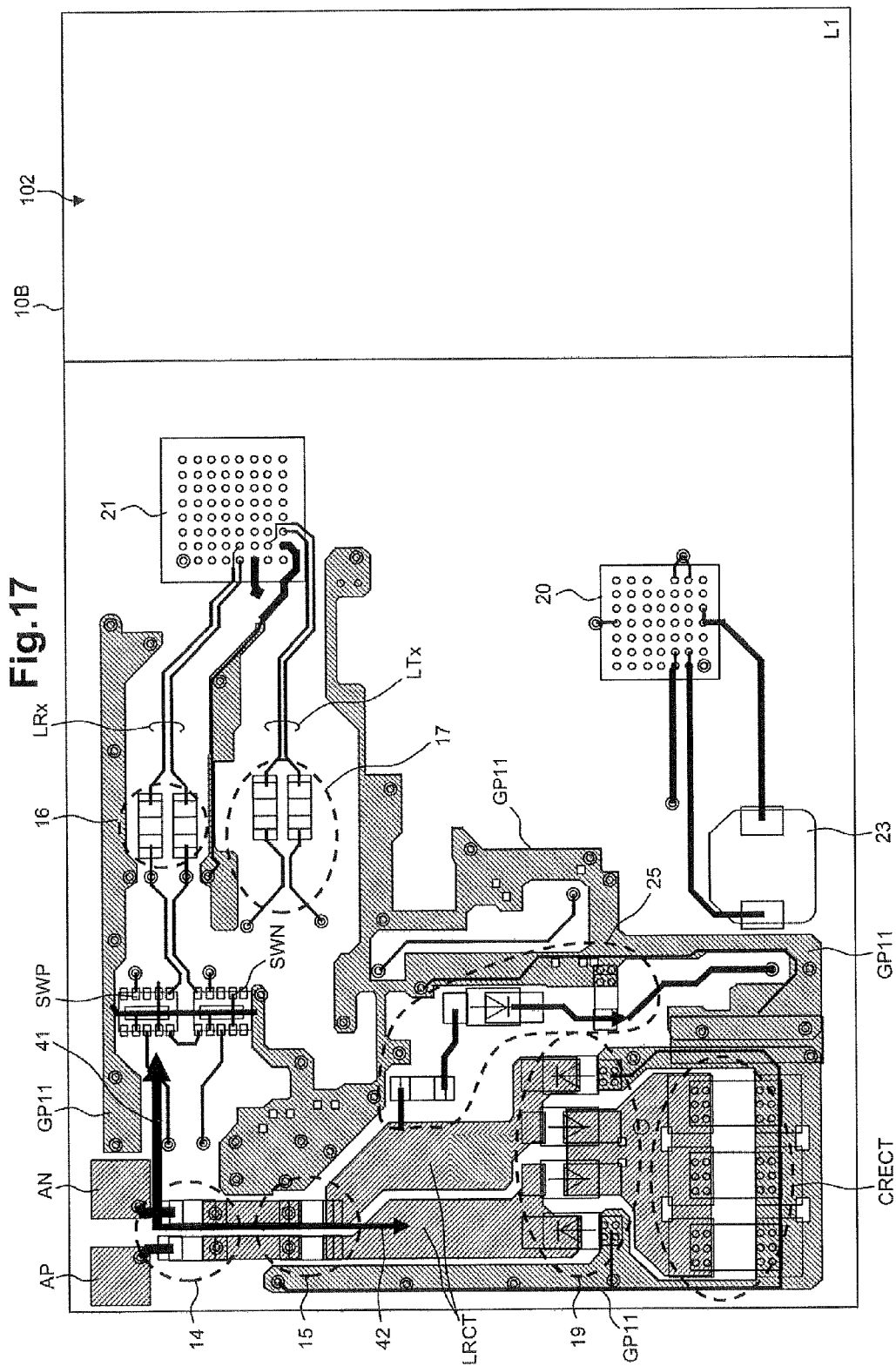
FIG. 17 is a plan view illustrating a conductive layer L1 of the mounting board 102.
Figure 18:
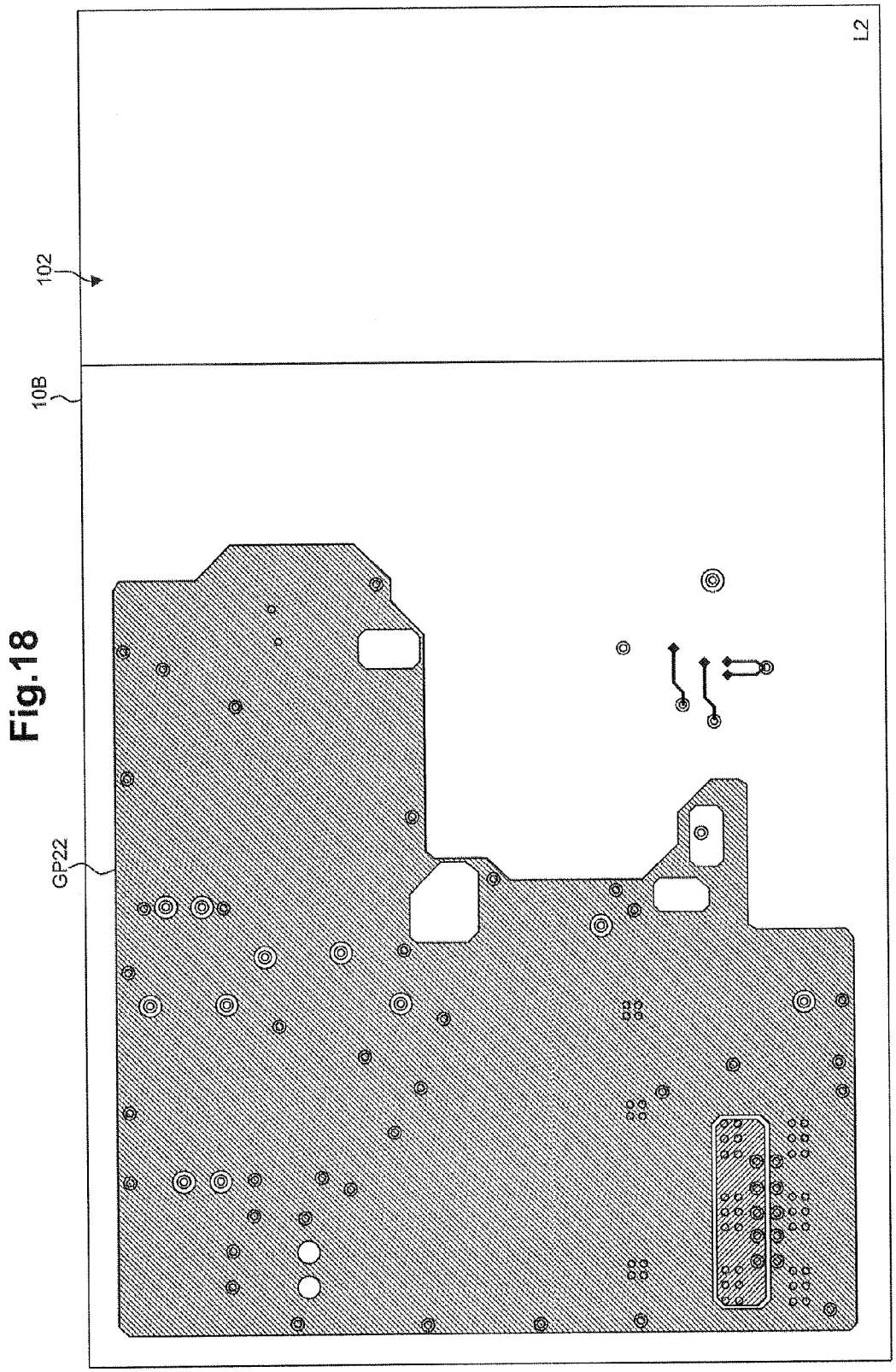
FIG. 18 is a plan view illustrating a conductive layer L2 of the mounting board 102.
Figure 19:
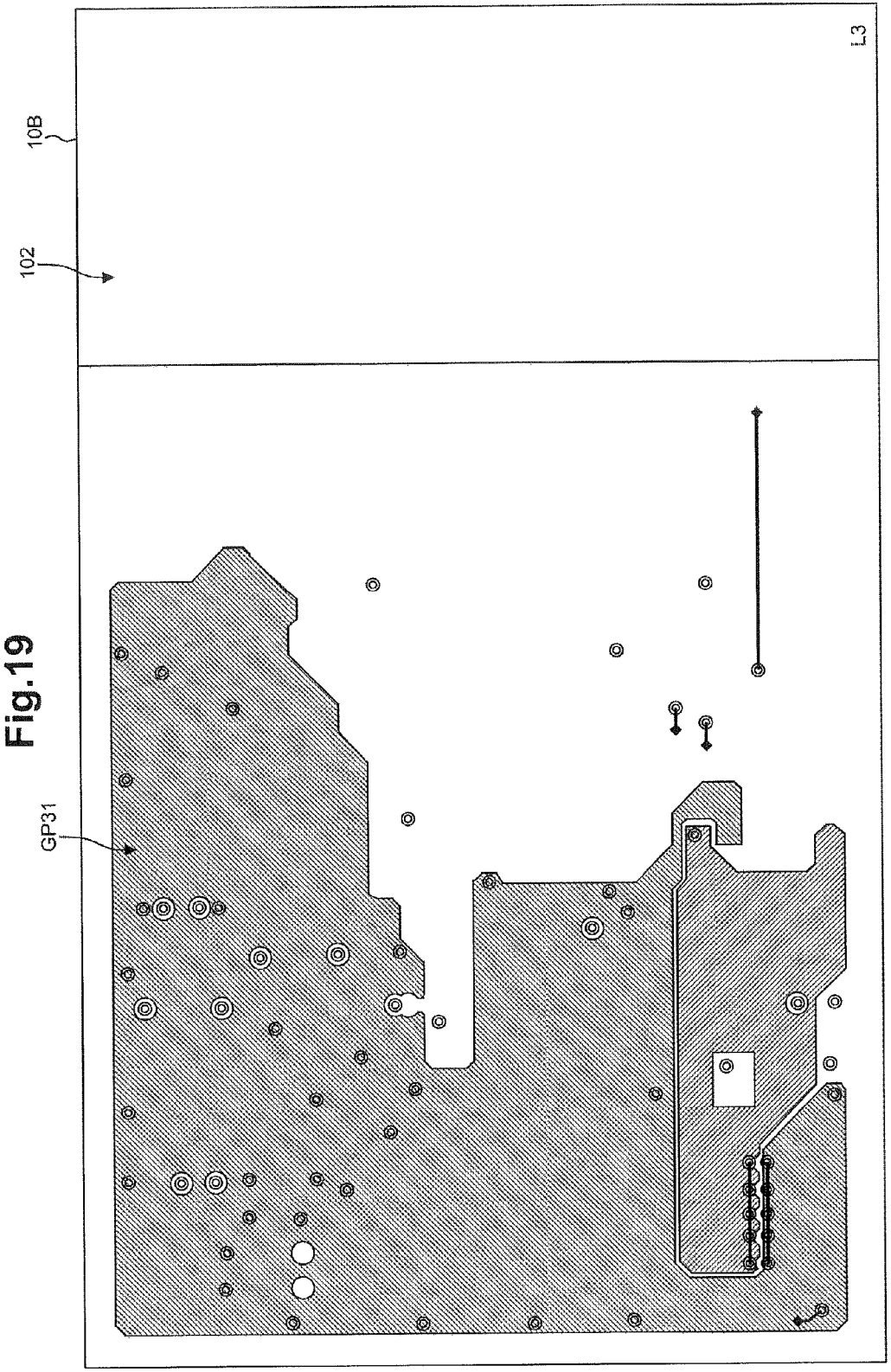
FIG. 19 is a plan view illustrating a conductive layer L3 of the mounting board 102.
Figure 20:
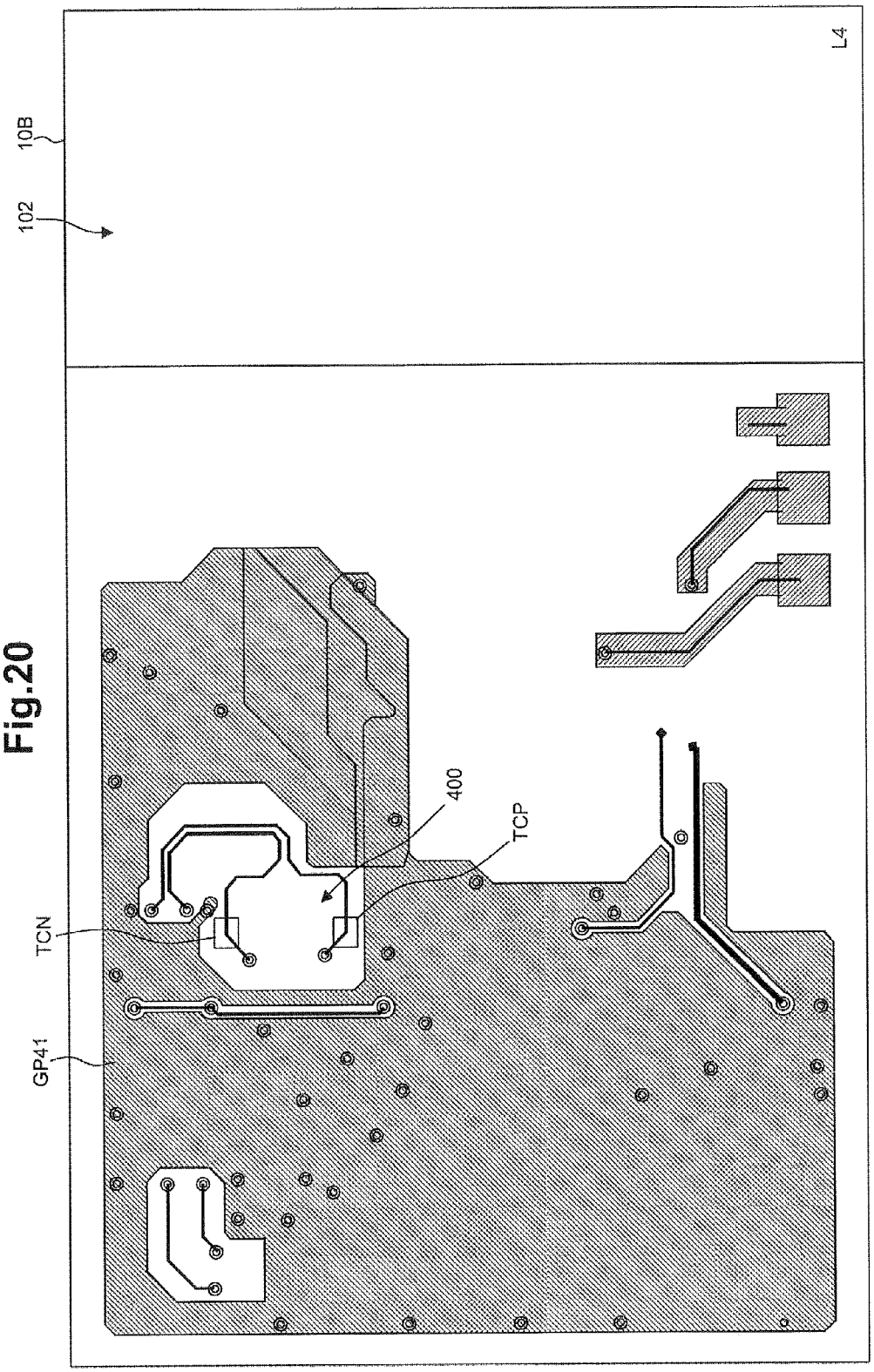
FIG. 20 is a plan view illustrating a conductive layer L4 of the mounting board 102.

FIG. 17 is a plan view illustrating a conductive layer L1 of the mounting board 102, FIG. 18 is a plan view illustrating a conductive layer L2 of the mounting board 102, and FIG. 19 is a plan view illustrating a conductive layer L3 of the mounting board 102. In addition, FIG. 20 is a plan view illustrating a conductive layer L4 of the mounting board 102. Meanwhile, for convenience of description and easy understanding, only portions necessary for description such as wiring patterns, circuit components, and the like which are formed in the vicinity of the antenna electrodes AP and AN, a communication circuit 21, and a power supply IC 20 are shown in FIGS. 17 to 20, and the other portions are not shown in the drawing.

As illustrated in FIG. 17, the power supply system path 42 is formed so as to connect a rectifier circuit 19 and the antenna electrodes AP and AN without passing through the conductive layers L2 to L4 other than the conductive layer L1. Specifically, the antenna electrodes AP and AN and the rectifier circuit 19 are connected to each other by a wiring pattern formed in the conductive layer L1 through matching circuits 14 and 15 disposed on the conductive layer L1. Accordingly, the generation of a discontinuous point of impedance due to a parasitic resistance, a parasitic capacitance, and a parasitic inductance which are formed in a signal path between the rectifier circuit 19 and the antenna electrodes AP and AN can be suppressed, and thus it is possible to suppress the deterioration of a reception signal supplied to the rectifier circuit 19, which contributes to an improvement in the efficiency of power conversion by a power supply circuit.

Meanwhile, it is preferable that the communication system path 41 is also formed in a single conductive layer similar to the power supply system path 42, but the communication system path 41 is formed through a conductive layer other than the conductive layer L1 from a difficulty in forming both the communication system path 41 and the power supply system path 42 in a single conductive layer (difficulty in routing a wiring). FIGS. 17 to 20 illustrate a case where a signal path between the matching circuit 14 and a switch unit 18 in the communication system path 41 is formed through the conductive layers L2 to L4, as an example.

Layout arrangements of the other electronic components are the same as those of the mounting board 100 according to the first embodiment. In addition, in the mounting board 102, ground patterns GP11, GP22, GP31, and GP41 are formed in a region other than a region in which electronic components and a wiring pattern connecting the electronic components are formed in the conductive layers L1 to L4, similar to the mounting board 100.

As described above, according to the communication control device of the third embodiment, similar to the first embodiment, it is possible to achieve a reduction in the size of the communication control device while suppressing the deterioration of characteristics of the communication control device. In addition, the power supply system path 42 is formed in a single conductive layer, which contributes to an improvement in the efficiency of power conversion during the supply of power.

<<Fourth Embodiment>>

<Ground Pattern in which Slit for Suppressing Noise Propagation is Formed>

A mounting board of a communication control device according to a fourth embodiment is different from the mounting board 102 according to the third embodiment in that slits are formed in predetermined regions of ground patterns GP11, GP22, GP31, and GP41. Meanwhile, a circuit configuration of the communication control device according to the fourth embodiment is the same as that of the communication control device according to the third embodiment, and thus a detailed description thereof will not be repeated.

FIGS. 21 to 24 are plan views illustrating each conductive layer of a mounting board 103 in a communication control device 10C according to the fourth embodiment.

Figure 21:
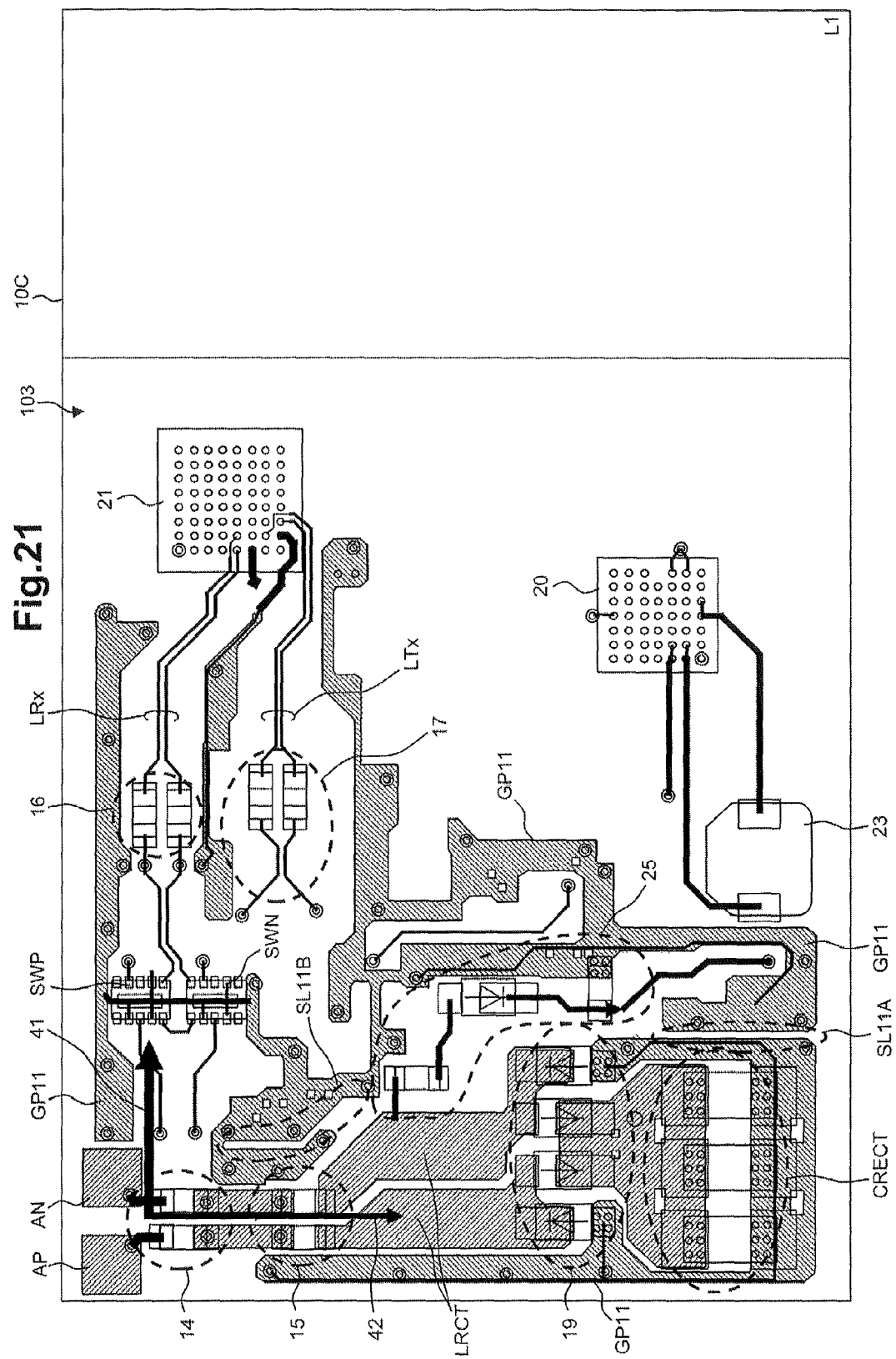
FIG. 21 is a plan view illustrating a conductive layer L1 of a mounting board 103.
Figure 22:
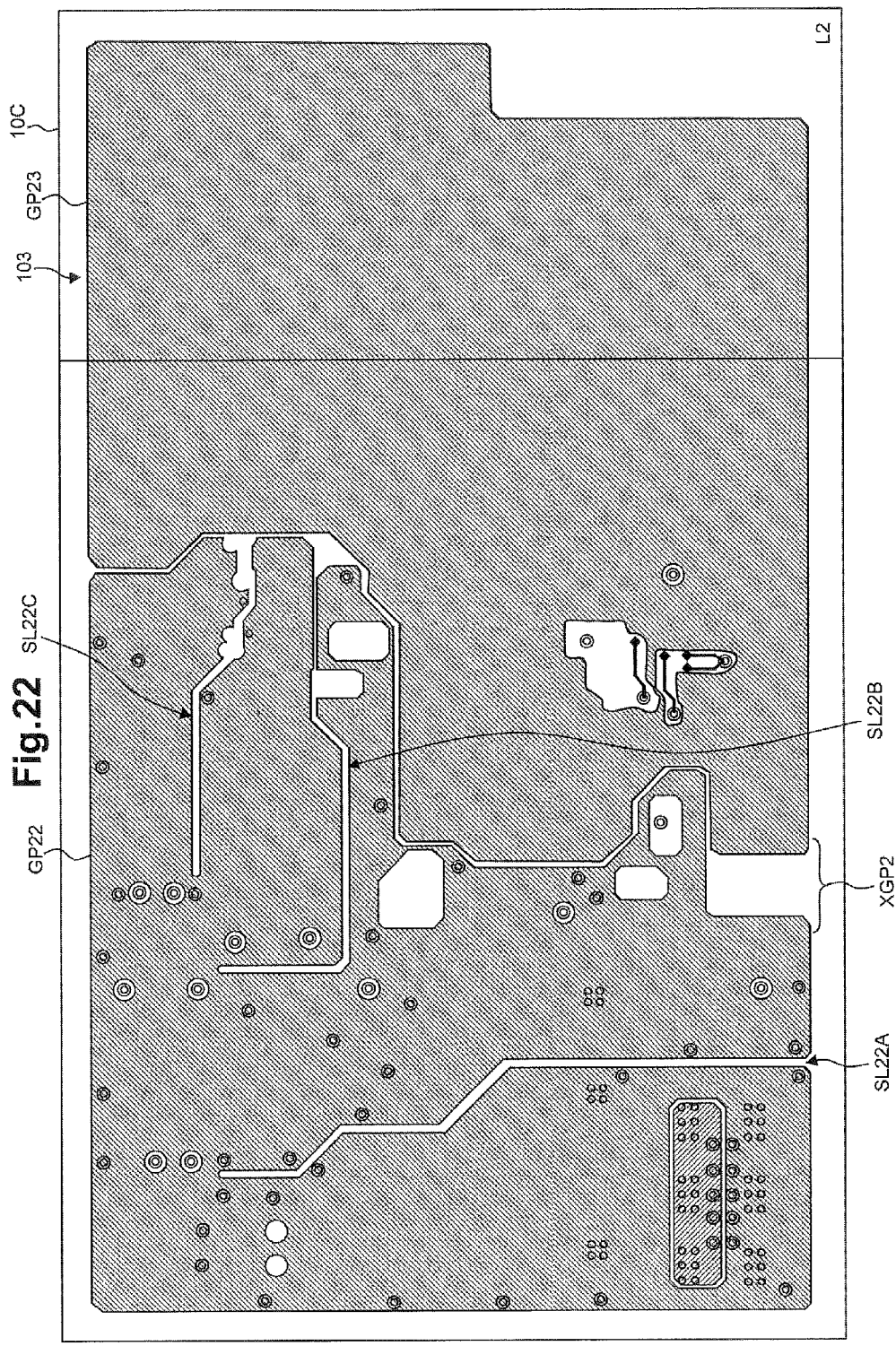
FIG. 22 is a plan view illustrating a conductive layer L2 of the mounting board 103.
Figure 23:
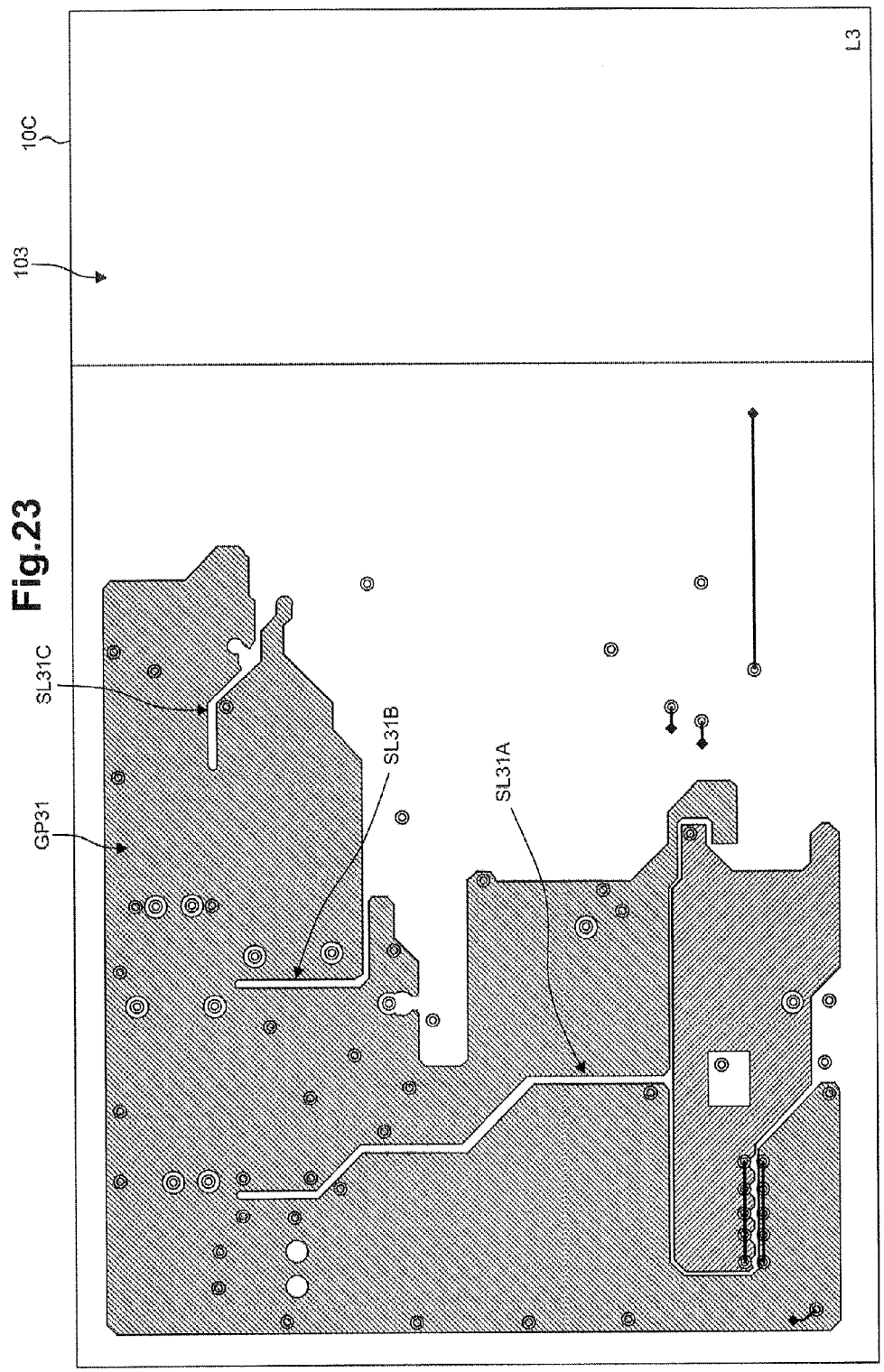
FIG. 23 is a plan view illustrating a conductive layer L3 of the mounting board 103.
Figure 24:
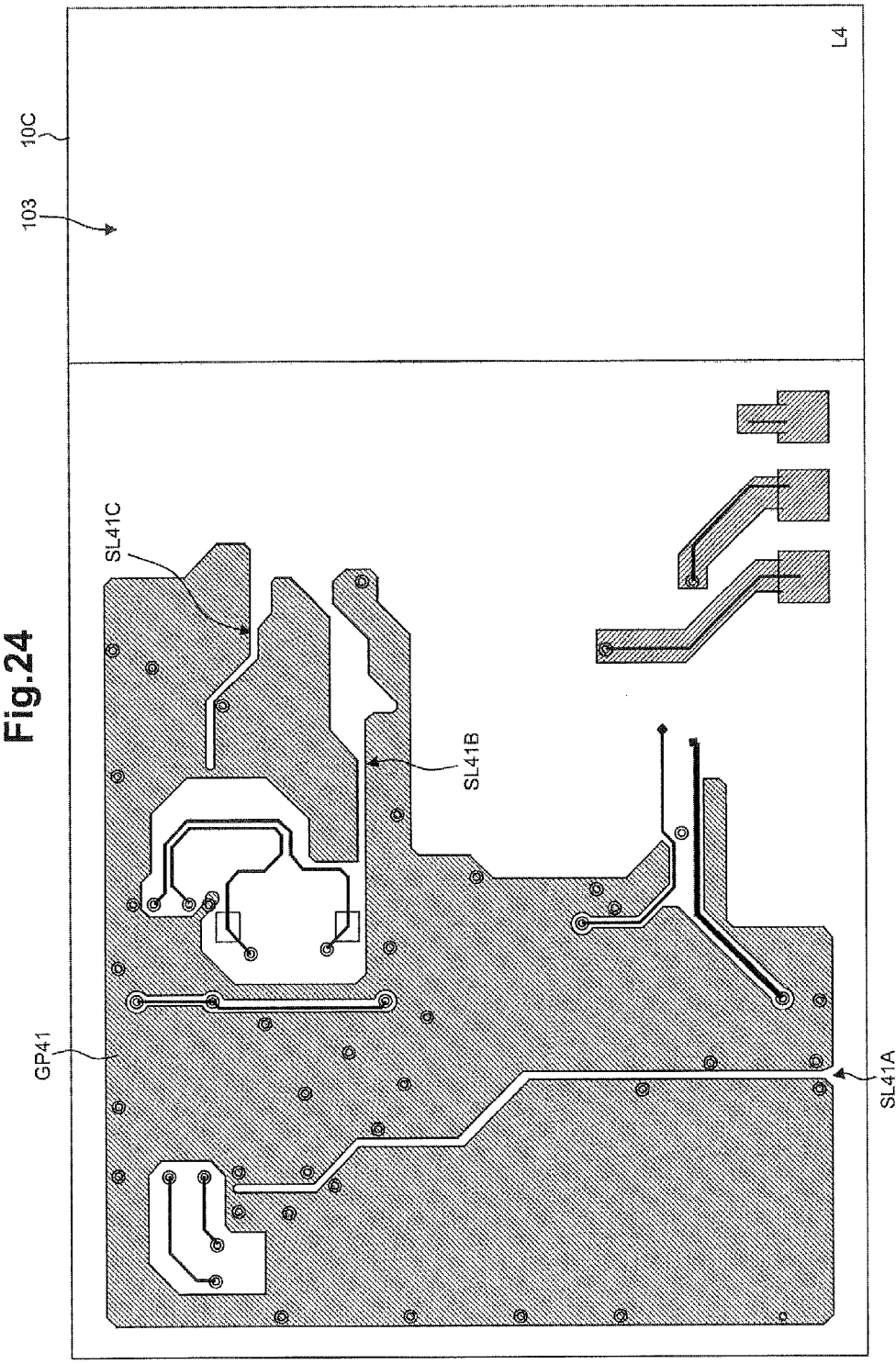
FIG. 24 is a plan view illustrating a conductive layer L4 of the mounting board 103.

FIG. 21 is a plan view illustrating a conductive layer L1 of the mounting board 103, FIG. 22 is a plan view illustrating a conductive layer L2 of the mounting board 103, FIG. 23 is a plan view illustrating a conductive layer L3 of the mounting board 103, and FIG. 24 is a plan view illustrating a conductive layer L4 of the mounting board 103. Meanwhile, for convenience of description and easy understanding, only portions necessary for description such as wiring patterns, circuit components, and the like which are formed in the vicinity of antenna electrodes AP and AN, a communication circuit 21, and a power supply IC 20 are shown in FIGS. 21 to 24, and the other portions are not shown in the drawing.

As illustrated in FIGS. 21 to 24, in the ground patterns GP11, GP22, GP31, and GP41, a slit is formed at a predetermined position similar to GP10 to GP40 according to the second embodiment.

For example, as illustrated in FIG. 21, in the ground pattern GP11 of the conductive layer L1, slits SL20A and SL20B are formed similar to the slits SL10A and SL10B of the ground pattern GP10 according to the second embodiment. In addition, as illustrated in FIG. 22, in the ground pattern GP22 of the conductive layer L2, slits SL22A to SL22C are formed similar to slits SL20A to SL20C of the ground pattern GP20. In addition, as illustrated in FIG. 23, in the ground pattern GP31 of the conductive layer L3, slits SL31A to SL31C are formed similar to the slits SL30A to SL30C of the ground pattern GP30. In addition, as illustrated in FIG. 24, in the ground pattern GP41 of the conductive layer L4, slits SL41A to SL41C are formed similar to the slits SL40A to SL40C of the ground pattern GP40. Thereby, similarly to the second embodiment, it is possible to reduce noise which is propagated through a ground pattern.

Further, as illustrated in FIG. 22, a ground pattern GP23 is further formed in the conductive layer L2. Similarly to the ground pattern GP21 according to the second embodiment, the ground patterns GP22 and GP23 are disposed so that a region XGP2 having no ground pattern is formed in a range overlapping a region in which a coil 23 is disposed on the conductive layer L1 when seen in a plan view. Accordingly, even in case that the power supply IC 20 is disposed in the vicinity of the coil 23, it is possible to prevent the deterioration of characteristics of the power supply IC 20 which is associated with the heat generation of the coil 23 and to suppress the deterioration of the efficiency of power conversion during the supply of power.

As described above, according to the communication control device of the fourth embodiment, it is possible to effectively suppress noise propagation and heat conduction through a ground pattern, similar to the mounting board 101 according to the second embodiment.

<<Fifth Embodiment>>

(Mounting Board Arranged so that Power Supply System Path and Communication System Path Face Each Other)

A communication control device according to a fifth embodiment is different from the communication control devices according to the first to fourth embodiments in that a power supply system path 42 and a communication system path 41 are disposed so as to face each other on a mounting board.

A circuit configuration of a communication control device 10D according to the fifth embodiment is different from that of the communication control device 10 according to the first embodiment in that a matching circuit 15 is connected to antenna electrodes AP and AN without passing through a matching circuit 14, and the circuit configurations are the same as each other in the other respects.

Figure 25:
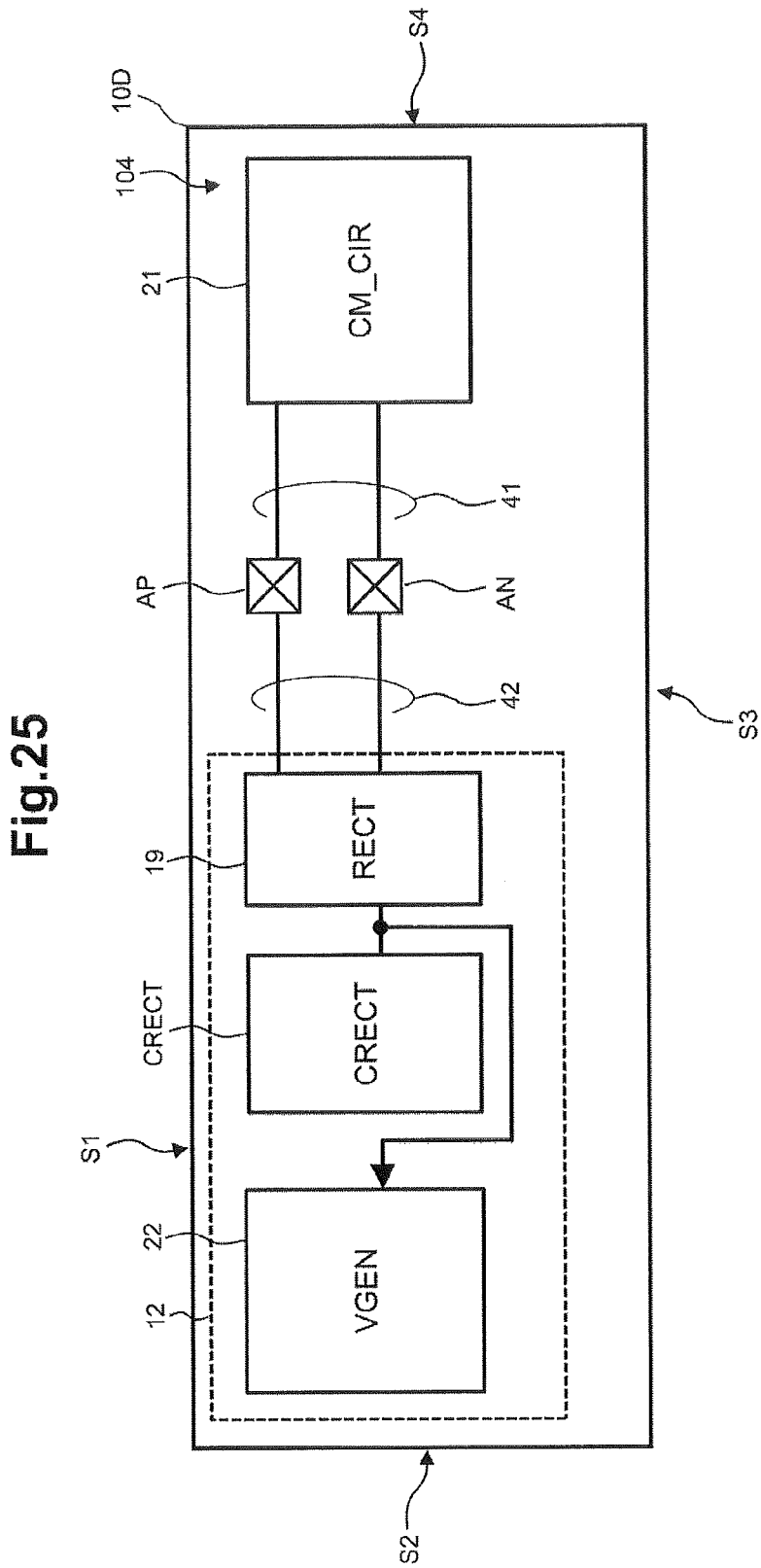
FIG. 25 is a diagram illustrating the outline of a layout arrangement of a mounting board 104 according to a fifth embodiment.

FIG. 25 is a diagram illustrating the outline of a layout arrangement of a mounting board 104 in the communication control device 10D according to the fifth embodiment. The mounting board 104 illustrated in the drawing is configured to include four conductive layers L1 to L4 similar to the mounting board 100 according to the first embodiment. Although not particularly limited, the mounting board 104 is configured as a one-side mounting substrate and is configured such that electronic components are mainly mounted on a conductive layer L1 constituting one principal surface (front face) and any electronic component is not mounted on a conductive layer L4 constituting a rear face.

As illustrated in the drawing, the mounting board 104 is configured as a rectangular substrate. The antenna electrodes AP and AN, a power supply circuit 12, and a communication circuit 21 are disposed on a principal surface (front face) of the mounting board 104 along one long side S1 of the principal surface. The communication circuit 21 is disposed on the side of one short side S4 perpendicular to the long side S1 with respect to the antenna electrodes AN and AP. On the other hand, the power supply circuit 12 is disposed on the side of the other short side S2 perpendicular to the long side S1 with respect to the antenna electrodes AN and AP. The communication system path 41 for connecting the communication circuit 21 and the antenna electrodes AN and AP extends to the side of the short side S4 along the long side S1. On the other hand, the power supply system path 42 for connecting the power supply circuit 12 and the antenna electrodes AN and AP extends to the side of the short side S2 along the long side S1.

Accordingly, the communication system path 41 is formed to be separated from the power supply system path 42 even in case that the power supply system path 42 and the communication system path 41 are formed on the same substrate so as to be parallel to each other, the communication system path 41 is not likely to be influenced by a magnetic field generated by the power supply system path 42. Thereby, it is possible to suppress noise from the power supply system path 42 to the communication system path 41, and the communication circuit 21 is not likely to be influenced by noise from the power supply circuit 12. In addition, it is possible to reduce the area of the substrate compared to a case where the communication system path 41 and the power supply system path 42 are simply formed to be separated from each other in order to suppress the influence of noise. This will be described in detail with reference to FIGS. 26 to 29.

Figure 26:
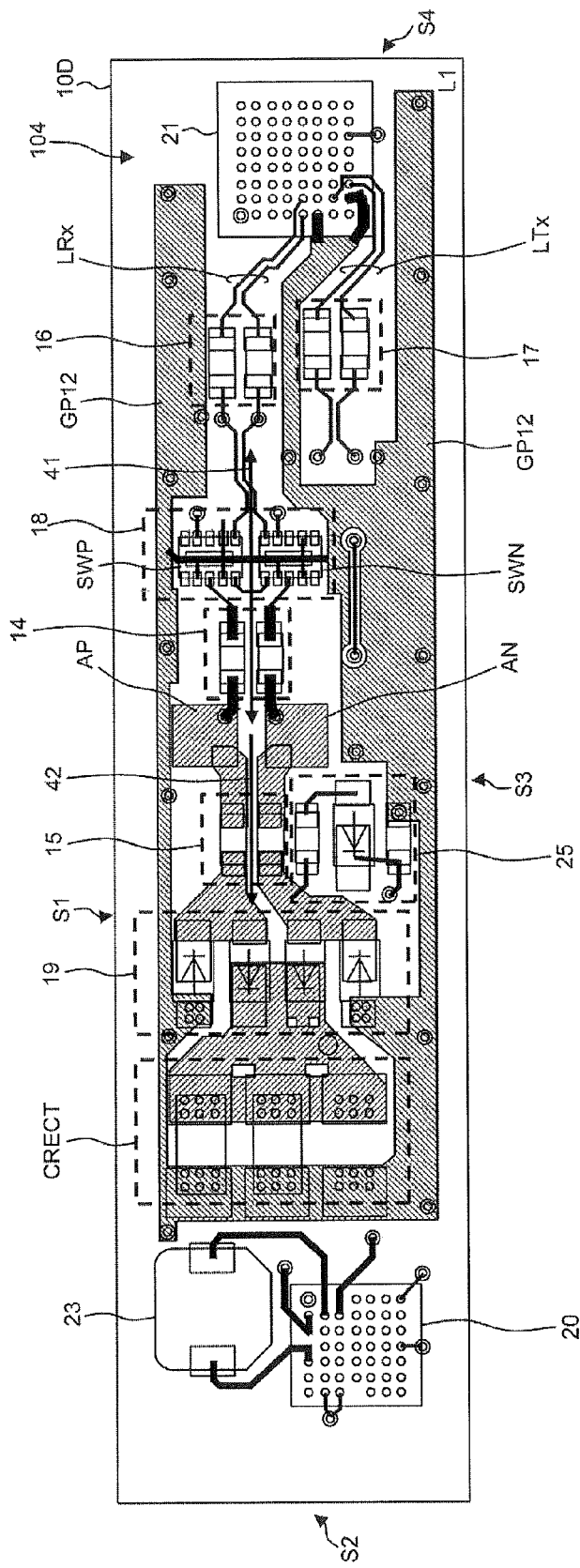
FIG. 26 is a plan view illustrating a conductive layer L1 of the mounting board 104.
Figure 27:
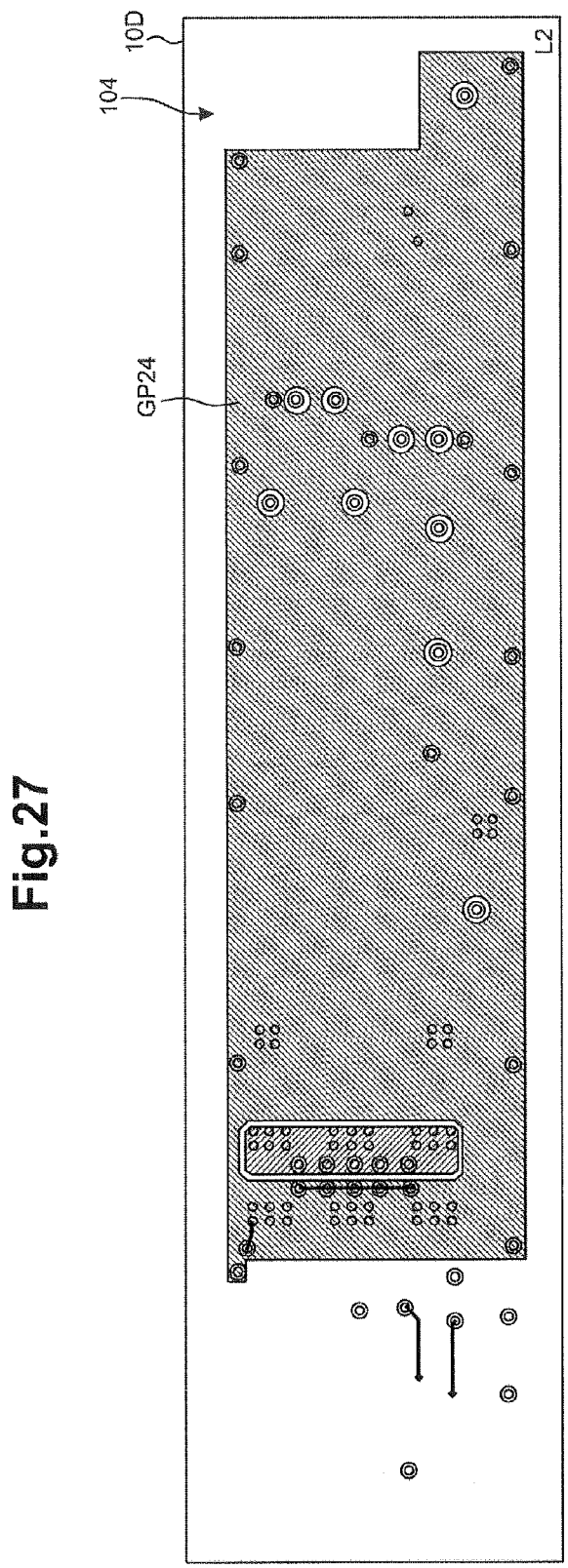
FIG. 27 is a plan view illustrating a conductive layer L2 of the mounting board 104.
Figure 28:
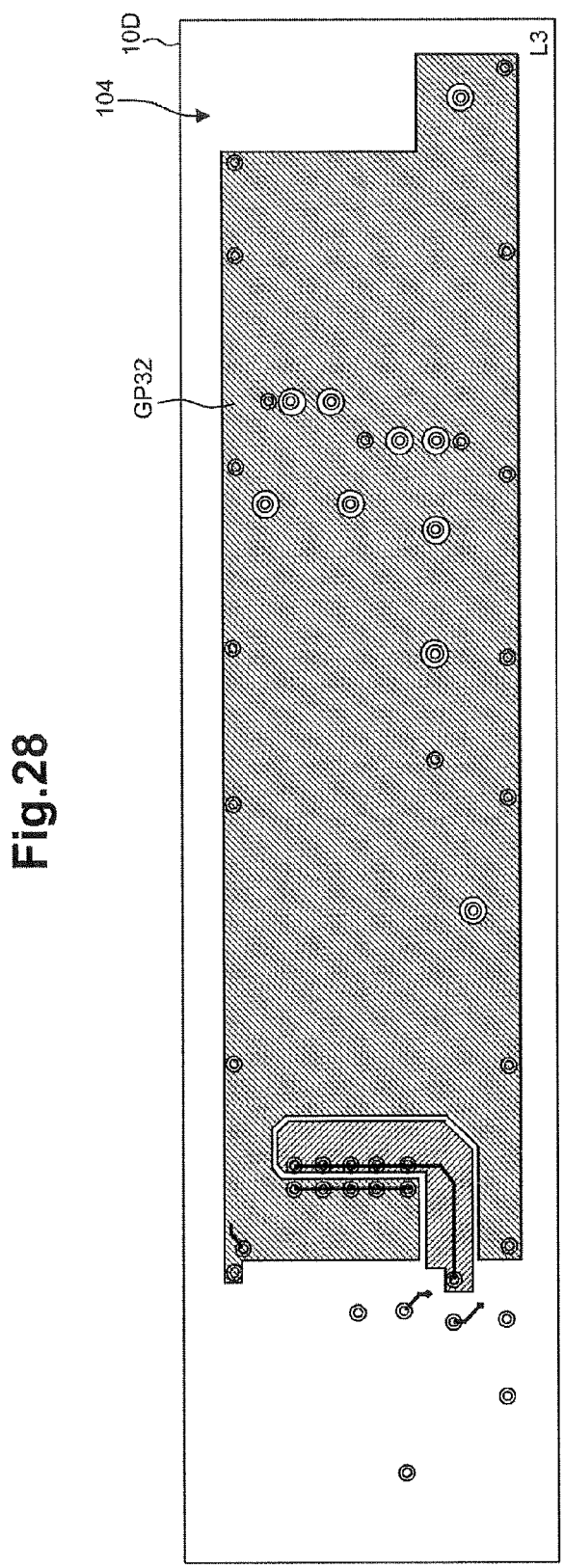
FIG. 28 is a plan view illustrating a conductive layer L3 of the mounting board 104.
Figure 29:
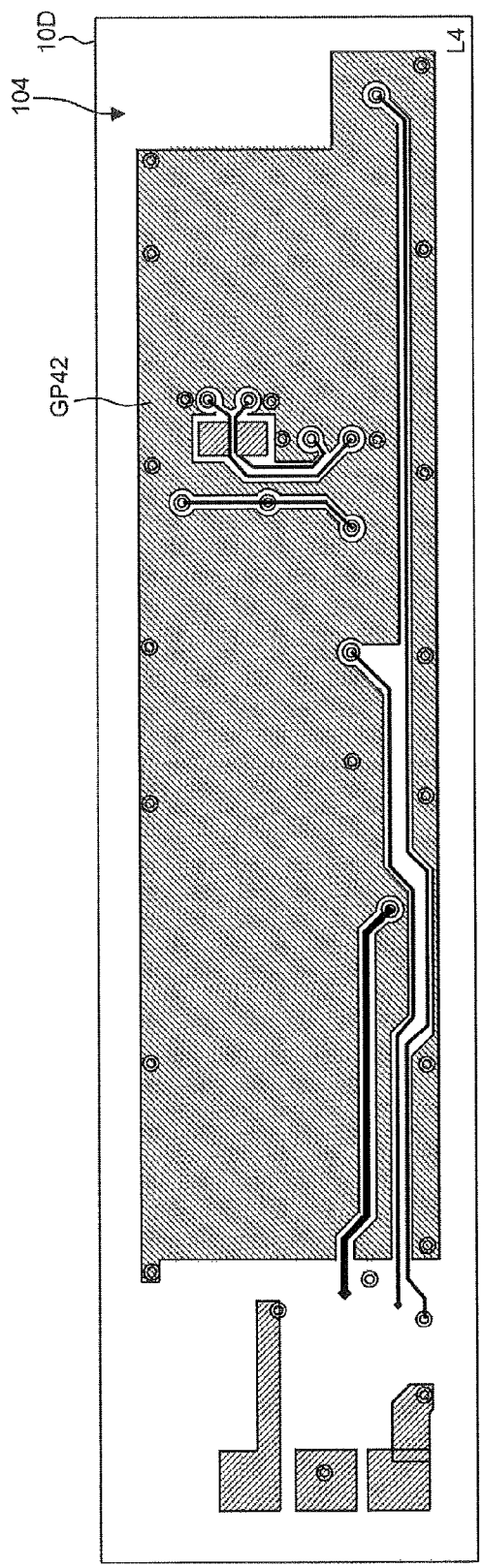
FIG. 29 is a plan view illustrating a conductive layer L4 of the mounting board 104.

FIG. 26 is a plan view illustrating a conductive layer L1 of the mounting board 104, FIG. 27 is a plan view illustrating a conductive layer L2 of the mounting board 104, and FIG. 28 is a plan view illustrating a conductive layer L3 of the mounting board 104. In addition, FIG. 29 is a plan view illustrating a conductive layer L4 of the mounting board 104. Meanwhile, for convenience of description and easy understanding, only portions necessary for description such as wiring patterns, circuit components, and the like which are formed in the vicinity of the antenna electrodes AP and AN, the communication circuit 21, and a power supply IC 20 are shown in FIGS. 26 to 29, and the other portions are not shown in the drawing.

As illustrated in FIG. 26, the antenna electrodes AP and AN, the power supply IC 20 and a coil 23 which constitute the power supply circuit 12, the communication circuit 21, matching circuits 14, 16, and 17, a switch unit 18, and various wiring patterns which constitute the communication path 41, and a matching circuit 15 and various wiring patterns which constitute the power supply system path 42 are formed in the conductive layer L1 constituting a principal surface.

As illustrated in FIG. 26, the antenna electrodes AP and AN are disposed at the center portion of the mounting board 104 so as to be lined up in a direction parallel to the side S2. A circuit of a communication system is disposed in the order of the matching circuit 14, the switch unit 18, the matching circuits 16 and 17, and the communication circuit 21 toward the side S4 from the antenna electrodes AP and AN. In addition, the communication system path 41 is formed so as to be extended in a direction of the side S4 along the side S1 with the antenna electrodes AP and AN as reference points. On the other hand, a circuit of a power supply system is disposed in the order of the matching circuit 15, a rectifier circuit 19, a capacitor CRECT, the coil 23, and the power supply IC 20 toward the side S2 from the antenna electrodes AP and AN. In addition, the power supply system path 42 is formed so as to be extended in a direction of the side S2 along the side S1 with the antenna electrodes AP and AN as reference points.

Accordingly, the power supply system path 42 and the communication system path 41 are disposed so as to face each other with respect to the antenna electrodes AP and AN, and thus it is possible to effectively prevent noise from being propagated to the communication circuit 21 and the communication system path 41 from an input line of the rectifier circuit 19 that may become the greatest noise source. In addition, the system paths are disposed so as to face each other as mentioned above, and thus it is possible to form the mounting board in an elongated shape. Thereby, for example, it is possible to form the mounting board 104 in an elongated shape in accordance with the shape of a lateral side of a battery 13 mounted on a power reception side device 2, and thus the degree of freedom of the arrangement of the mounting board 104 within the power reception side device 2 is increased.

Similarly to the mounting board 100 and the like of the first to fourth embodiments, a ground pattern is formed in a region other than a region in which electronic components and a wiring pattern connecting the electronic components are formed. For example, as illustrated in FIG. 26, a ground pattern GP12 is formed in the conductive layer L1 so as to surround the semiconductor devices such as the communication circuit 21 and the power supply IC 20 and the other electronic components, signal wirings, and electrodes. In addition, as illustrated in FIG. 27, a ground pattern GP24 is formed in the conductive layer L2 so as to overlap at least portions of the communication system path 41 and the power supply system path 42 which are formed in the conductive layer L1 when seen in a plan view. Similarly, as illustrated in FIGS. 28 and 29, a ground pattern GP32 and a ground pattern GP42 are formed in the conductive layer L3 and the conductive layer L4, respectively, so as to overlap at least portions of the communication system path 41 and the power supply system path 42 when seen in a plan view.

In the mounting board 104, the power supply system path 42 is formed so as to connect the rectifier circuit 19 and the antenna electrodes AP and AN without passing through the conductive layers L2 to L4 other than the conductive layer L1. Specifically, the antenna electrodes AP and AN and the rectifier circuit 19 are connected to each other by a wiring pattern formed in the conductive layer L1 through the matching circuit 15 disposed on the conductive layer L1. Thereby, similarly to the third embodiment, it is possible to suppress the deterioration of a reception signal supplied to the rectifier circuit 19, which contributes to an improvement in the efficiency of power conversion during the supply of power in the communication control device 10D.

In addition, a reception signal path LRx is formed so as to connect the communication circuit 21 and the antenna electrodes AP and AN without passing through the conductive layers L2 to L4 other than the conductive layer L1. Specifically, as illustrated in FIG. 26, the antenna electrodes AP and AN and external terminals Rxp and Rxn of the communication circuit 21 are connected to each other through the matching circuit 14, switch circuits SWP and SWN, and the matching circuit 16 which are disposed on the conductive layer L1, and a wiring pattern, formed in the conductive layer L1, which connects the circuits to each other. Thereby, similarly to the first embodiment, it is possible to suppress the deterioration of a reception signal supplied to the communication circuit 21, which contributes to an improvement in communication characteristics of the communication control device 10D.

As described above, according to the communication control device of the fifth embodiment, it is possible to achieve a reduction in the size of the communication control device while suppressing the deterioration of characteristics of the communication control device.

21 <Sixth Embodiment>>

<Ground Pattern in which Slit for suppressing Noise Propagation is formed>

A mounting board of a communication control device according to a sixth embodiment is different from the mounting board 104 according to the fifth embodiment in that slits are formed in predetermined regions of ground patterns GP12, GP24, GP32, and GP42. Meanwhile, a circuit configuration of a communication control device 10E according to the sixth embodiment is the same as that of the communication control device according to the fifth embodiment, and thus a detailed description thereof will not be repeated.

FIGS. 30 to 34 are plan views illustrating each conductive layer of a mounting board 105 according to the sixth embodiment.

Figure 30:
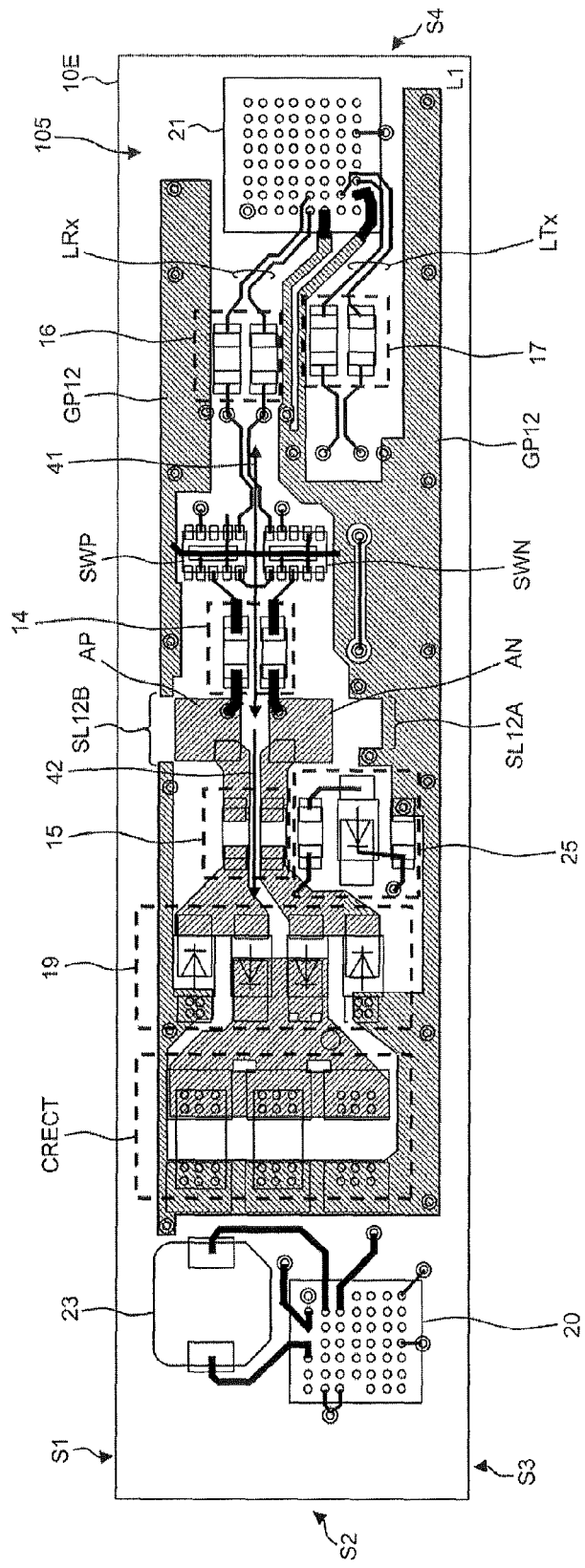
FIG. 30 is a plan view illustrating a conductive layer L1 of a mounting board 105.
Figure 31:
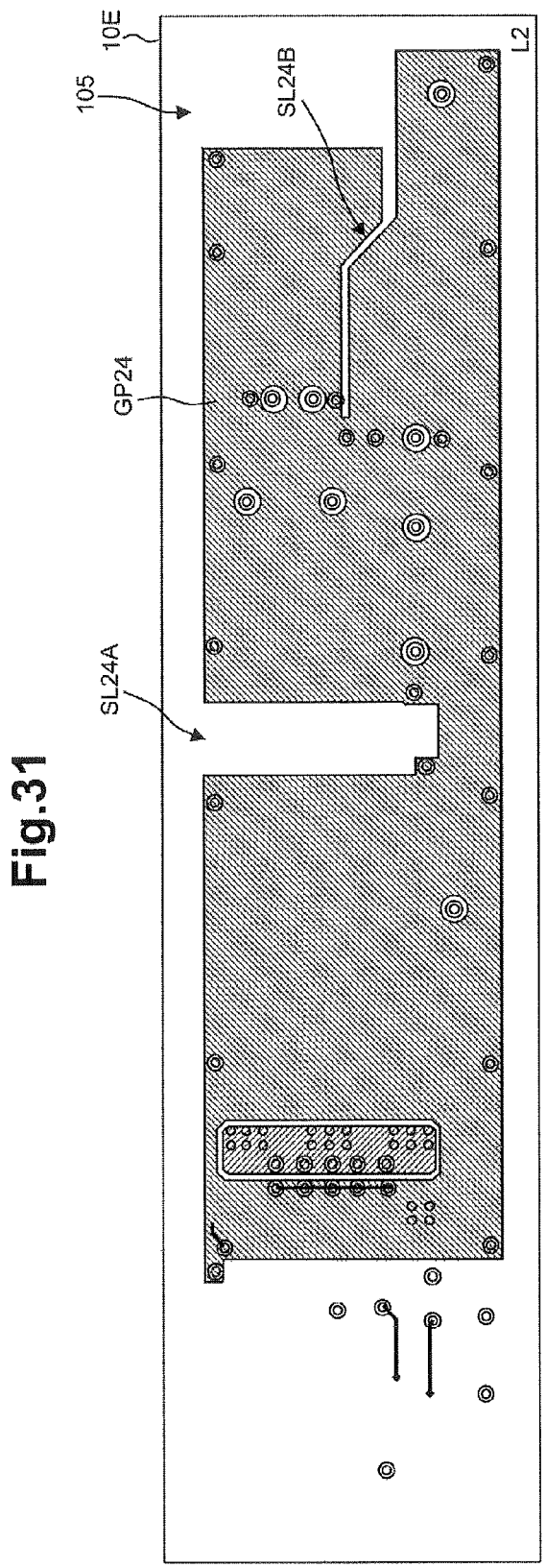
FIG. 31 is a plan view illustrating a conductive layer L2 of the mounting board 105.
Figure 32:
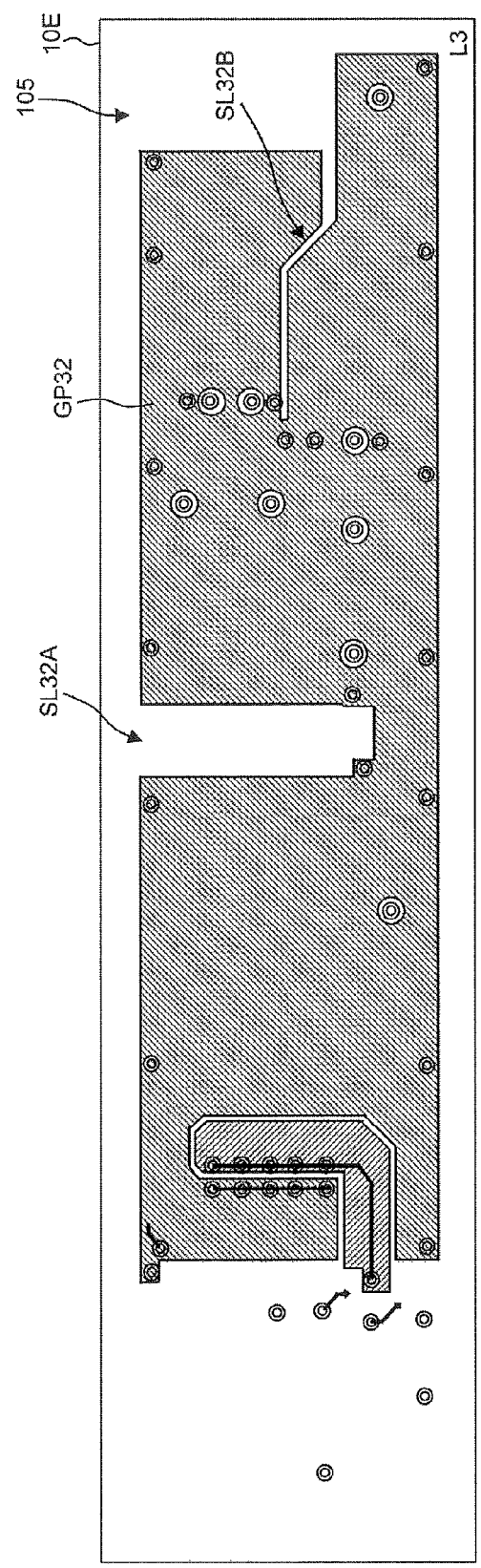
FIG. 32 is a plan view illustrating a conductive layer L3 of the mounting board 105.
Figure 33:
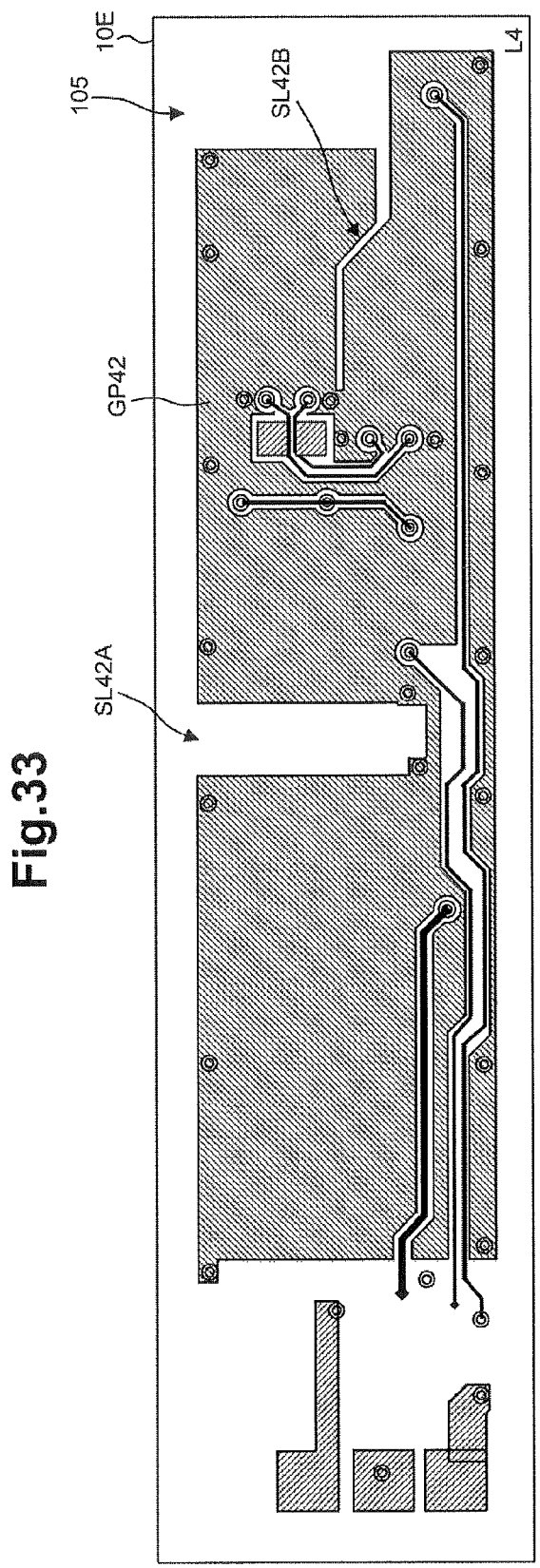
FIG. 33 is a plan view illustrating a conductive layer L4 of the mounting board 105.

FIG. 30 is a plan view illustrating a conductive layer L1 of the mounting board 105, FIG. 31 is a plan view illustrating a conductive layer L2 of the mounting board 105, FIG. 32 is a plan view illustrating a conductive layer L3 of the mounting board 105, and FIG. 33 is a plan view illustrating a conductive layer L4 of the mounting board 105. Meanwhile, for convenience of description and easy understanding, only portions necessary for description such as wiring patterns, circuit components, and the like which are formed in the vicinity of antenna electrodes AP and AN, a communication circuit 21, and a power supply IC 20 are shown in FIGS. 30 to 33, and the other portions are not shown in the drawing.

As illustrated in FIG. 30, in a ground pattern GP12 formed in the conductive layer L1, slits SL12A and SL12B are formed so as to divide the ground pattern GP12 into two regions with the antenna electrodes AP and AN as boundaries. Thereby, it is possible to reduce noise which is propagated to a communication system path 41 and a communication circuit 21 through the ground pattern GP12 from a power supply system path 42.

In addition, as illustrated in FIGS. 31 to 33, in the ground patterns GP24, GP32, and GP42, slits SL24A, SL32A, and SL42A are respectively formed so as to divide the ground pattern into a region on the side of a short side S2 and a region on the side of a short side S4 with the antenna electrodes AP and AN as boundaries when seen in a plan view. For example, the slits SL24A, SL32A, and SL42A are formed so as to overlap the antenna electrodes AP and AN. Thereby, it is possible to reduce noise which is propagated to the communication system path 41 and the communication circuit 21 through the ground patterns GP24, GP32, and GP42 from the power supply system path 42. In particular, the slit SL24A is formed in the ground pattern GP24 of the conductive layer L2 adjacent to the conductive layer L1, and thus it is possible to effectively suppress noise which is propagated to the communication system path 41.

Further, as illustrated in FIGS. 31 to 33, in the ground patterns GP24, GP32, and GP42, slits SL24B, SL32B, and SL42B are respectively formed in a region interposed between a reception signal path LRx and a transmission signal path LTx when seen in a plan view. Thereby, it is possible to prevent noise propagation between the reception signal path LRx and the transmission signal path LTx.

Preferably, the width of each of the slits (SL12A, SL24A, and the like) formed in the ground patterns GP12, GP24, GP32, and GP42 is set to be three times or more as large as a minimum line width of a signal wiring formed on the mounting board 105. Thereby, as described above, it is possible to effectively suppress noise propagation through the ground pattern. For example, the width of the slit is set to be equal to or greater than the width of each of the antenna electrodes AN and AP.

As described above, according to the mounting board 105 of the sixth embodiment, a slit is appropriately formed in the ground pattern formed in each of the conductive layers L1 to L4, and thus it is possible to effectively suppress the propagation of noise through the ground pattern.

Although the invention made by the inventor has been described so far in detail on the basis of the embodiments, the invention is not limited thereto, and it is needless to say that various modifications can be made without departing from the scope of the invention.

For example, a configuration in which a power supply system path and a power reception system path, which are connected to an antenna, are disposed so as to be perpendicular to each other and a configuration in which a power supply system path and a power reception system path are disposed so as to face each other, which are described in the first to sixth embodiments, can be applied not only to an NFC type wireless power supply system but also to a non-contact type IC card, and the like. In addition, the above-mentioned configurations can be applied not only to a mounting board of a communication control device constituting a power reception side device 2 but also to a mounting board constituting a power transmission side device 3. Thereby, similarly to the power reception side device 2, it is possible to achieve a reduction in the size of the mounting board of the power transmission side device while suppressing the deterioration of communication characteristics of the power transmission side device 3.

In addition, in the first to sixth embodiments, a case where a step-down type switching regulator is constituted by a power supply IC 20, an external coil 23, and a capacitor COUT has been described, but the type of switching regulator is not particularly limited. For example, a step-up type switching regulator or an insulation type switching regulator may be used.

INDUSTRIAL APPLICABILITY

The invention can be widely applied not only to an NFC type wireless power supply system but also to a system that switches between the supply or reception of power and communication for transmitting information by sharing one antenna.

EXPLANATION OF REFERENCE NUMERALS

1: wireless power supply system
2: power reception side device
3: power transmission side device
31: NFC control unit
32: power supply circuit
33: driving circuit
34: matching circuit
35: antenna
10: communication control device (communication module)
11: antenna
12: power supply circuit
13: battery
14 to 17: matching circuit
100: mounting board
AP, AN: antenna electrode
CP1 TO CP4, CN1 TO CN4, CT: capacitive element
CTX: trimmer capacitor
TCP, TCN: electrode
41: communication system path
42: power supply system path
LRCT: signal pattern (signal path) connecting matching circuit 15 and rectifier circuit 19
LRx: reception signal path
LTx: transmission signal path
18: switch unit
19: rectifier circuit
20: power supply IC
21: communication circuit
22: voltage control unit
23: coil (inductor)
XGP2: region with no ground pattern
24: internal circuit
25: detection unit
SWP, SWN: switch circuit
CRECT capacitor
Rxp, Rxn: reception terminal of communication circuit
Txp, Txn: transmission terminal of communication circuit
201: voltage generation unit
202: switching regulator controller unit
203: series regulator
204: selector
205: charging control circuit
206: control unit
207: NFC power supply unit (NFC_VREG)
210: communication unit
211: memory unit
212: control unit
222: error amplifier
221: PWM comparator
224: reference voltage
223: diode
220: switching transistor
OUT1, OUT2, IN: external terminal of power supply IC 20
ND1: node
201a: first principal surface (front face)

201*b*: second principal surface (rear face)
231: electrode
232: solder bump
CR1: corner portion
S1 to S4: side
L1 to L4: conductive layer
GP10 TO GP40, GP21: ground pattern (ground plane)
400: region for disposing trimmer capacitor CTX
101: mounting board
10A: communication control device
SL10A, SL10B: slit of GP10
SL20A to SL20C: slit of GP20
SL30A to SL30C: slit of GP30
SL40A to SL40C: slit of GP40
250 to 253, 350 to 353, 450 to 453: region
500 to 504, 510 to 513: region
600: mounting board
P: heat source
102, 103: mounting board
10B, 10C: communication control device
GP11, GP22, GP23, GP31, GP41: ground pattern
SL11A, SL11B: slit of GP11
SL22A to SL22C: slit of GP22
SL31A to SL31C: slit of GP31
vSL41A to SL41C: slit of GP4v1
104, 105: mounting board
10D, 10E: communication control device
GP12, GP24, GP32, GP42: ground pattern
SL12A, SL12B: slit of GP12
SL24A, SL24B: slit of GP24
SL32A, SL32B: slit of GP32
SL42A, SL42B: slit of GP42

What is claimed is:

1. A communication control device which is mounted on a mounting board, the device comprising:
an antenna electrode to which an antenna is connected;
a power supply circuit which is connected to the antenna electrode;
a communication circuit which is connected to the antenna electrode,
wherein the antenna electrode is disposed at one corner portion on a first principal surface of the mounting board,
wherein the communication circuit is disposed on a side of a first side of the first principal surface which shares the corner portion, and
wherein the power supply circuit is disposed on a side of a second side facing the first side,
a first signal path connecting the antenna electrode and the communication circuit extending along the first side; and
a second signal path connecting the antenna electrode and the power supply circuit extending along a third side that shares the corner portion and is perpendicular to the first side,
wherein the power supply circuit includes:
a rectifier circuit that rectifies an AC signal which is supplied to the antenna electrode; and
a DC/DC converter that generates a DC voltage on a basis of a voltage which is rectified by the rectifier circuit,
wherein the second signal path includes a signal path for transmitting a signal from the antenna electrode to the rectifier circuit,
wherein the rectifier circuit is disposed along the third side,
wherein the DC/DC converter is disposed so as to be separated from the rectifier circuit in a direction of a fourth side facing the third side,
wherein the mounting board comprises a multi-layered substrate including a plurality of conductive layers,
wherein the antenna electrode, the power supply circuit, the communication circuit, the first signal path, the second signal path, and a first ground pattern for connection to a ground potential are formed on a first conductive layer of the plurality of conductive layers constituting the first principal surface in the mounting board,
wherein the first ground pattern is formed in a vicinity of the first signal path and the second signal path, and
wherein the first ground pattern has a slit formed along at least a portion of the second signal path, in a region interposed between the first signal path and the second signal path.

2. The communication control device according to claim 1, wherein a second ground pattern for connection to a ground potential is formed on a second conductive layer of the plurality of conductive layers, different from the first conductive layer, so as to overlap the first signal path and the second signal path which are formed on the first conductive layer, when seen in a plan view, and
wherein the second ground pattern has a slit formed along at least a portion of the second signal path, in a region interposed between the first signal path and the second signal path when seen in a plan view.

3. The communication control device according to claim 2, wherein the second ground pattern includes a slit formed along at least a portion of the first signal path, in a region interposed between the first signal path and the second signal path when seen in a plan view.

4. The communication control device according to claim 2, wherein the second conductive layer includes a layer which is adjacent to the first conductive layer.

5. The communication control device according to claim 4, wherein a width of the slit formed in each of the first ground pattern and the second ground pattern is set to be three times or more as large as a minimum line width of a signal wiring formed on the substrate.

6. The communication control device according to claim 5, wherein the second ground pattern includes a slit formed in a region interposed between the reception signal path and the transmission signal path when seen in a plan view.

7. The communication control device according to claim 2, wherein the first signal path includes a reception signal path for supplying a signal received by the antenna to the communication circuit through the antenna electrode, and a transmission signal path for supplying a signal transmitted from the communication circuit to the antenna through the antenna electrode, and
wherein the reception signal path is formed so as to connect the antenna electrode and the communication circuit without passing through the conductive layer other than the first conductive layer.

8. The communication control device according to claim 2, wherein the second signal path is formed so as to connect the antenna electrode and the power supply circuit without passing through the conductive layer other than the first conductive layer.

9. The communication control device according to claim 2, wherein the first signal path includes a matching circuit for matching impedance between the antenna and the communication circuit, wherein the matching circuit is configured to include a capacitive element, wherein the mounting board includes an electrode for connecting the capacitive element and a variable capacitor in parallel, wherein the capacitive element is disposed on the first conductive layer, and wherein the electrode for the connection of the variable capacitor is formed on a third conductive layer constituting a second principal surface facing the first principal surface.

10. The communication control device according to claim 9, wherein the matching circuit is disposed on the transmission signal path.

11. The communication control device according to claim 2, wherein the first signal path includes a switch circuit that switches between connection and disconnection between the antenna electrode and the communication circuit, and wherein the switch circuit connects the antenna electrode and the communication circuit to each other in case that the communication circuit performs communication through the antenna, and disconnects the antenna electrode and the communication circuit from each other in case that the power supply circuit generates a DC voltage on a basis of an AC signal received by the antenna.

12. The communication control device according to claim 2, wherein the DC/DC converter includes a coil and a semiconductor device for realizing a switching regulator by performing switching control of a current flowing to the coil, wherein a third ground pattern for connection to the ground potential is formed on the second conductive layer so as to overlap at least a portion of the semiconductor device disposed on the first conductive layer when seen in a plan view, and wherein the second ground pattern and the third ground pattern are disposed so as to form a region having no ground pattern in a range overlapping a region in which the coil is disposed, when seen in a plan view.

13. A communication control device in which an antenna electrode to which an antenna is connected, a power supply circuit which is connected to the antenna electrode, and a communication circuit which is connected to the antenna electrode are mounted on a rectangular mounting board, wherein the antenna electrode, the power supply circuit, and the communication circuit are disposed on a principal surface of the mounting board along one long side of the principal surface, wherein the communication circuit is disposed on a side of one short side perpendicular to the long side with respect to the antenna electrode, wherein the power supply circuit is disposed on a side of an other short side perpendicular to the long side with respect to the antenna electrode, wherein a first signal path for connecting the antenna electrodes and the communication circuit extends to the side of the one short side along the long side, wherein a second signal path for connecting the antenna electrodes and the power supply circuit extends to the side of the other short side along the long side, wherein the mounting board includes a multi-layered substrate including a plurality of conductive layers, wherein the antenna electrode, the power supply circuit, the communication circuit, the first signal path, the second signal path, and a first ground pattern for connection to a ground potential are formed in a first conductive layer of the plurality of conductive layers constituting the first principal surface in the mounting board, wherein the first ground pattern is formed in the vicinity of the first signal path and the second signal path, and wherein the first ground pattern has a slit which is formed so as to divide the pattern into two regions with the antenna electrode as a boundary.

14. The communication control device according to claim 13, wherein a second ground pattern for connection to a ground potential is formed in a second conductive layer of the plurality of conductive layers, different from the first conductive layer, so as to overlap the first signal path and the second signal path which are formed in the first conductive layer, when seen in a plan view, and wherein the second ground pattern includes a slit which is formed so as to divide the second ground pattern into a region on the side of the one short side and a region on the side of the other short side with the antenna electrode as a boundary when seen in a plan view.

15. The communication control device according to claim 14, wherein the second conductive layer includes a layer which is adjacent to the first conductive layer.

16. The communication control device according to claim 14, wherein a width of the slit formed in each of the first ground pattern and the second ground pattern is set to be three times or more as large as a minimum line width of a signal wiring formed on the substrate.

* * * * *